United States Patent
Dong

(10) Patent No.: US 11,503,113 B2
(45) Date of Patent: Nov. 15, 2022

(54) TASK OFFLOADING AND ROUTING IN MOBILE EDGE CLOUD NETWORKS

(71) Applicant: Huawei Technologies Co., Ltd., Shenzhen (CN)

(72) Inventor: Lijun Dong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/147,972

(22) Filed: Jan. 13, 2021

(65) Prior Publication Data

US 2021/0136142 A1   May 6, 2021

Related U.S. Application Data

(63) Continuation of application No. PCT/US2019/035649, filed on Jun. 5, 2019.
(Continued)

(51) Int. Cl.
*H04L 67/1021* (2022.01)
*H04L 67/1008* (2022.01)
(Continued)

(52) U.S. Cl.
CPC ........ *H04L 67/1021* (2013.01); *G06F 9/5033* (2013.01); *G06F 9/5094* (2013.01);
(Continued)

(58) Field of Classification Search
CPC ....... H04L 67/10; H04L 67/12; H04L 47/762; H04L 47/803; H04L 67/04;
(Continued)

(56) References Cited

U.S. PATENT DOCUMENTS 10,037,231 B1 *   7/2018   Jakhetiya ............ H04L 67/2847
2014/0130602 A1   5/2014   Heckenberger et al.
(Continued)

FOREIGN PATENT DOCUMENTS

KR   20140130602 A   11/2014
WO   2017067586 A1   4/2017

OTHER PUBLICATIONS

Lyu, Xinchen et al, Selective Offloading in Mobile Edge Computing for the Green Internet of Things, Jan./Feb. 2018, IEEE Network, pp. 54-60, 2018 (Year: 2018).*
(Continued)

*Primary Examiner* — Djenane M Bayard
(74) *Attorney, Agent, or Firm* — Conley Rose, P.C.

(57) ABSTRACT

A method implemented by a network element (NE) in a mobile edge cloud (MEC) network, comprising receiving, by the NE, an offloading request message from a client, the offloading request message comprising task-related data describing a task associated with an application executable at the client, determining, by the NE, whether to offload the task to an edge cloud server of a plurality of edge cloud servers distributed within the MEC network based on the task-related data and server data associated with each of the plurality of edge cloud servers, transmitting, by the NE, a response message to the client based on whether the task is offloaded to the edge cloud server.

20 Claims, 10 Drawing Sheets

Related U.S. Application Data

(60) Provisional application No. 62/711,294, filed on Jul. 27, 2018.

(51) Int. Cl.
  *H04L 67/101* (2022.01)
  *H04W 4/50* (2018.01)
  *G06F 9/50* (2006.01)

(52) U.S. Cl.
  CPC ........ *H04L 67/101* (2013.01); *H04L 67/1008* (2013.01); *H04W 4/50* (2018.02); *G06F 2209/509* (2013.01)

(58) Field of Classification Search
  CPC ............. H04L 67/1008; H04L 67/1023; H04L 67/2842; H04L 67/289; H04L 67/32; H04L 67/34; H04L 9/3247; H04L 47/70; H04L 67/101; H04L 67/1012; H04L 67/1021; H04L 67/1095; H04L 2463/144; H04L 2463/146; H04L 41/0843; H04L 41/0869; H04L 41/5054; H04L 47/781; H04L 49/70; H04L 63/1425; H04L 63/1458; H04L 63/1491; H04L 67/06; H04L 67/1002; H04L 67/2852; H04L 67/322; H04L 47/125; H04L 67/60; H04L 41/12; H04L 43/16; H04L 45/42; H04L 45/566; H04L 45/64; H04L 47/10; H04L 47/2441; H04L 63/0227; H04L 65/612; H04L 65/80; H04L 67/51; H04L 9/40; H04L 12/2801; H04L 12/2803; H04L 12/2838; H04L 12/2869; H04L 12/2898; H04L 27/0006; H04L 27/26; H04L 27/2637; H04L 27/38; H04L 41/0806; H04L 41/0823; H04L 41/5003; H04L 43/08; H04L 43/0876; H04L 43/10; H04L 45/70; H04L 47/821; H04L 5/0007; H04L 5/0037; H04L 5/0041; H04L 5/006; H04L 63/0464; H04L 63/20; H04L 67/01; H04L 9/0894; H04L 47/80; H04L 67/1029; H04L 67/59; H04L 67/63

See application file for complete search history.

(56) References Cited

U.S. PATENT DOCUMENTS

| | | |
|---|---|---|
| 2014/0287754 A1* | 9/2014 | Goldhamer ........... H04W 36/22 455/436 |
| 2017/0067586 A1 | 3/2017 | Jones et al. |
| 2018/0183855 A1 | 6/2018 | Sabella et al. |

OTHER PUBLICATIONS

Liu, H., et al., "Mobile Edge Cloud System: Architectures, Challenges, and Approaches," IEEE Systems Journal, vol. 12, No. 3, Sep. 2018, 14 pages.

Mao, Y., et al., "A Survey on Mobile Edge Computing: The Communication Perspective," airXiv: 1701.01090v4 [cs.IT], Jun. 13, 2017, 37 pages.

Mach, P., et al., "Mobile Edge Computing: A Survey on Architecture and Computation Offloading," airXiv: 1702.05309v2 [cs,IT], Mar. 13, 2017, 28 pages.

Jia, M., et al., "Heuristic offloading of concurrent tasks for computation-intensive applications in mobile cloud computing," IEEE International Conference on Computation Communication, 2014, 6 pages.

Ge, Y., et al., "A game Theoretic Resource Allocation for Overall Energy Minimization in Mobile Cloud Computing System," ISLPED'12, Jul. 30-Aug. 1, 2012, 6 pages.

Labidi, W., et al., "Energy-optimal resource scheduling and computation offloading in small cell networks," 22nd International Conference on Telecommunication (ICT), Sydney, Australia, 2015, pp. 313-318.

Zhang, W., et al., "Energy-optimal mobile cloud computing under stochastic wireless channel," IEEE Transactions on Wireless Communication, vol. 12, No. 9, pp. 4569-4581, Sep. 2013, 13 pages.

You, C., et al., "Energy-Efficient Resource Allocation for Mobile-Edge Computation Offloading," airXiv: 1605.08518v3 [cS.IT], Nov. 28, 2016, 14 pages.

Vakilinia, S., et al., "Modeling of the resource allocation in cloud computing centers," Computer Networks: The International Journal of Computer and Telecommunications Networking, vol. 91, pp. 453-470, Nov. 2015, 15 pages.

Li, R., et al., "A new Framework and Protocol for Future networking Applications," ACM ISBN, Aug. 2018, 6 pages.

* cited by examiner

406 

440 — Determine a processing delay of a plurality messages occurring at a plurality of NEs along a path between the client and the edge cloud server before a result of the task after being executed by the edge cloud server is transmitted to the client 443 — Determine a transmission delay of the plurality of messages forwarded the plurality of NEs 446 — Determine an execution time for the edge cloud server to perform the task and transmit the result of the task back to the client 449 — Determine a latency experienced during offloading of the task to the edge cloud server based on a sum of the processing delay, transmission delay, and execution time 451 — Determine a latency experienced during local execution of the task at the client

FIG. 4C

TASK OFFLOADING AND ROUTING IN MOBILE EDGE CLOUD NETWORKS

CROSS-REFERENCE TO RELATED APPLICATIONS

The present application is a continuation of International Patent Application PCT/US2019/035649 filed Jun. 5, 2019 by Futurewei Technologies, Inc., and entitled "Task Offloading and Routing in Mobile Edge Cloud Networks", which claims the benefit of U.S. Provisional Patent Application No. 62/711,294 filed Jul. 27, 2018 by Lijun Dong, and entitled "Big IP based Mechanisms for Computation Offloading Task Routing in Mobile Edge Cloud Network," which is incorporated herein by reference as if reproduced in its entirety.

FIELD OF INVENTION

The present disclosure pertains to the field of mobile edge cloud networks. In particular, the present disclosure relates to the offloading of tasks or processes from a client to an edge cloud server located within the mobile edge cloud network.

BACKGROUND

Cloud computing is a model for the delivery of hosted services, which may then be made available to clients through, for example, the Internet. Cloud computing enables ubiquitous, convenient, on-demand network access to a cloud computing network. The cloud computing network includes a large shared pool of configurable computing, processing, and storage resources that can be provisioned and employed with minimal management effort or service provider interaction. By employing cloud computing resources, providers may deploy and manage emulations of particular computer systems through a network, which provide convenient access to the computing resources.

Clients may utilize cloud computing to perform computation offloading, in which certain tasks that are typically performed by a client are instead performed at a server within the cloud computing network. However, the cloud computing networks and the clients are typically separated by a fairly large geographical distance. For this reason, offloading certain tasks across the Internet to the cloud computing network typically involves a high latency and a high network resource overhead. Mobile edge cloud (MEC) networks have been introduced to migrate cloud services from a cloud computing network to networks that are more proximate to the client.

SUMMARY

According to a first aspect of the present disclosure, there is provided a method implemented by a network element (NE) in a MEC network. The method comprises receiving, by the NE, an offloading request message from a client, the offloading request message comprising task-related data describing a task associated with an application executable at the client, determining, by the NE, whether to offload the task to an edge cloud server of a plurality of edge cloud servers distributed within the MEC network based on the task-related data and server data associated with each of the plurality of edge cloud servers, transmitting, by the NE, a response message to the client based on whether the task is offloaded to the edge cloud server.

In a first implementation of the method according to the first aspect, the offloading request message is encoded as a Big Packet Protocol (BPP) packet comprising a block field, wherein the block field is configured to carry metadata associated with the task and instructions to be executed by one or more NEs on a path between the client and the edge cloud server, wherein the metadata comprises at least one of the task-related data, characteristics of the client, or characteristics of the edge cloud server.

In a second implementation of the method according to the first aspect or any preceding implementation of the first aspect, wherein determining whether to offload the task to the edge cloud server comprises comparing an amount of energy consumed by the client during offloading of the task to the edge cloud server with an amount of energy consumed during local execution of the task at the client, and comparing a latency experienced during offloading of the task to the edge cloud server with a latency experienced during local execution of the task at the client.

In a third implementation of the method according to the first aspect or any preceding implementation of the first aspect, wherein comparing the amount of energy consumed during offloading of the task to the edge cloud server with the amount of energy consumed during local execution of the task at the client comprises determining an amount of energy consumed by the client during transmission of offloading data, reception of one or more response messages, and waiting for task completion during the offloading of the task, and determining the amount of energy consumed during local execution of the task at the client.

In a fourth implementation of the method according to the first aspect or any preceding implementation of the first aspect, wherein comparing the latency experienced during offloading of the task to the edge cloud server with the latency experienced during local execution of the task at the client comprises determining a processing delay of a plurality of messages occurring at a plurality of NEs along a path between the client and the edge cloud server before a result of the task after being executed by the edge cloud server is transmitted to the client, determining a transmission delay of the plurality of messages forwarded by the plurality of NEs, determining an execution time for the edge cloud server to perform the task and transmit the result of the task back to the client, determining the latency experienced during offloading of the task to the edge cloud server based on a sum of the processing delay, transmission delay, and execution time, and determining the latency experienced during local execution of the task at the client.

In a fifth implementation of the method according to the first aspect or any preceding implementation of the first aspect, wherein determining whether to offload the task to the edge cloud server comprises determining that the task should be offloaded to the edge cloud server in response to an amount of energy consumed at the device during offloading of the task to the edge cloud server being less than an amount of energy consumed during local execution of the task at the client, a latency experienced during offloading of the task to the edge cloud server being less than a latency experienced during local execution of the task at the client, and a response time between the client sending the offloading request message and receiving the response message during offloading of the task to the edge cloud server being less than a deadline response time specified by the client.

In a sixth implementation of the method according to the first aspect or any preceding implementation of the first aspect, wherein the method further comprises determining the edge cloud server from the plurality of edge cloud servers based on an offloading metric associated with each of the plurality of edge cloud servers, wherein the offloading metric is based on a latency and an energy consumption experienced as a result of offloading the task to the edge cloud server.

In a seventh implementation of the method according to the first aspect or any preceding implementation of the first aspect, wherein determining whether to offload the task to the edge cloud server comprises determining that the task should be executed locally at the client in response to an amount of energy consumed at the device during offloading of the task to the edge cloud server being greater than or equal to an amount of energy consumed during local execution of the task at the client.

In an eighth implementation of the method according to the first aspect or any preceding implementation of the first aspect, the response message is received from the edge cloud server.

In a ninth implementation of the method according to the first aspect or any preceding implementation of the first aspect, the response message includes an acknowledgment from the edge cloud server indicating that the edge cloud server is able to perform the task on behalf of the client.

In a tenth implementation of the method according to the first aspect or any preceding implementation of the first aspect, the response message further includes a request to receive offloading data that is used to perform the task, and wherein the method further comprises receiving, by the NE, the offloading data from the client, and transmitting, by the NE, the offloading data to the edge cloud server.

In an eleventh implementation of the method according to the first aspect or any preceding implementation of the first aspect, the response message includes a result of the task after being performed at the edge cloud server.

In a twelfth implementation of the method according to the first aspect or any preceding implementation of the first aspect, wherein the method further comprises maintaining, by the NE, the server data in a memory of the NE, wherein the server data comprises constant parameters and dynamic parameters associated with each of the edge cloud servers, wherein the constant parameters describe features of each of the plurality of edge cloud servers that stay constant over time, and wherein the dynamic parameters describe features of the plurality of edge cloud servers that are frequently updated based on network conditions.

In a thirteenth implementation of the method according to the first aspect or any preceding implementation of the first aspect, the NE is a pivotal NE associated with the edge cloud server, wherein the method comprises maintaining, by the NE, updated server data describing the edge cloud server.

In a fourteenth implementation of the method according to the first aspect or any preceding implementation of the first aspect, the NE is a pivotal NE associated with the edge cloud server, and wherein the method further comprises determining, by the NE, whether the edge cloud server is able to perform the task on behalf of the client, and transmitting, by the NE, the offloading request message to another pivotal NE associated with another edge cloud server in response to determining that the edge cloud server is not able to perform the task on behalf of the client.

In a fifteenth implementation of the method according to the first aspect or any preceding implementation of the first aspect, the NE is a first intermediate NE on a path between the client and the edge cloud server.

According a second aspect of the present disclosure, there is provided an NE comprising a memory comprising instructions, and a processor coupled to the memory and configured to execute the instructions, which cause the processor to be configured to receive an offloading request message from a client, the offloading request message comprising task-related data describing a task associated with an application executable at the client, determine whether to offload the task to an edge cloud server of a plurality of edge cloud servers distributed within the MEC network based on the task-related data and server data associated with each of the plurality of edge cloud servers, and transmit a response message to the client based on whether the task is offloaded to the edge cloud server.

In a first implementation of the NE according to the second aspect, the offloading request message is encoded as a Big Packet Protocol (BPP) packet comprising a block field, wherein the block field is configured to carry metadata associated with the task and instructions to be executed by one or more NEs on a path between the client and the edge cloud server, wherein the metadata comprises at least one of the task-related data, characteristics of the client, or characteristics of the edge cloud server.

In a second implementation of the NE according to the second aspect or any preceding implementation of the second aspect, the instructions further cause the processor to be configured to compare an amount of energy consumed during offloading of the task to the edge cloud server with an amount of energy consumed during local execution of the task at the client, and compare a latency experienced during offloading of the task to the edge cloud server with a latency experienced during local execution of the task at the client.

According to a third aspect of the present disclosure, there is provided an apparatus. The apparatus comprises a means for receiving an offloading request message from a client, the offloading request message comprising task-related data describing a task associated with an application executable at the client, a means for determining whether to offload the task to an edge cloud server of a plurality of edge cloud servers distributed within the MEC network based on the task-related data and server data associated with each of the plurality of edge cloud servers, and a means for transmitting a response message to the client based on whether the task is offloaded to the edge cloud server.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A-C are flowcharts illustrating methods of offloading and routing a task to an edge cloud server within the MEC network according to various embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
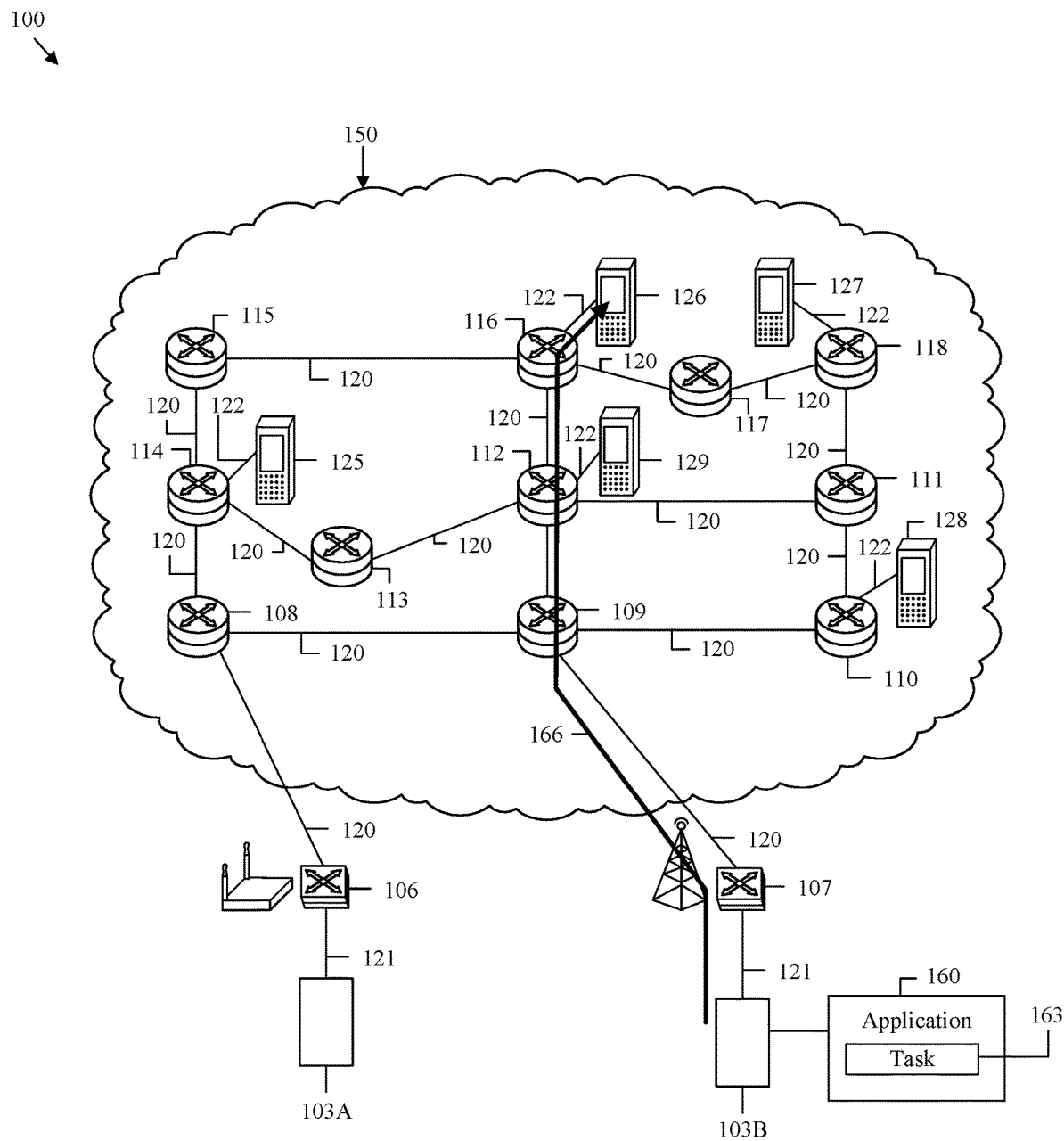
FIG. 1 is a diagram illustrating a MEC network configured to implement task offloading and routing according to various embodiments of the disclosure.

FIG. 1 is a diagram illustrating a MEC network 100 configured to implement task offloading and routing according to various embodiments of the disclosure. In an embodiment, MEC network 100 may be a packet-switched network in which a transmission protocol, such as IP version 6 (IPv6) or Big Packet Protocol (BPP) is implemented.

As shown by FIG. 1, the MEC network 100 includes clients 103A-B, network elements (NEs) 106-107, and a domain 150. The domain 150 may a subnetwork within the MEC network 100 that is positioned proximate the clients 103A-B. For example, the domain 150 may be a metropolitan area network located proximate to the clients 103A-B and that is based on Ethernet standards. The domain 150 may also be any other subnetwork located between the clients 103A-B and a content provider network or cloud computing network.

As shown by FIG. 1, domain 150 includes NEs 108-118, and edge cloud servers 125-129. Client 103A is connected to the NE 106 via a client-to-network link 121, and client 103B is also connected to NE 107 via a client-to-network link 121. NEs 106-118 are interconnected by inter-network links 120. NE 114 is connected to the edge cloud server 125 via an NE-to-server link 122, NE 116 is connected to the edge cloud server 126 via an NE-to-server link 122, NE 118 is connected to the edge cloud server 127 via an NE-to-server link 122, NE 110 is connected to the edge cloud server 128 via an NE-to-server link 122, and NE 112 is connected to the edge cloud server 129 via an NE-to-server link 122. The client-to-network links 121, inter-network links 120, and NE-to-server links 122 may each be wired links, wireless links, optical fibers, physical paths, logical paths, or interfaces configured to connect network devices within the MEC network 100. The client-to-network links 121, inter-network links 120, and NE-to-server links 122 are links suitable to forward traffic through the MEC network 100 as should be appreciated.

The clients 103A-B are client devices or end user devices, which are configured to execute applications 160 on behalf of a user operating the client 103A-B. For example, the client 103A-B may be a mobile phone, a mobile tablet, a wearable device, a personal computer, a laptop, a stationary device, a mobile machine type device, or any other type of user equipment (UE) operated by a user.

NEs 106 and 107 are each network devices, such as a router, switch, gateway, bridge, or virtual machine (VM) configured to encapsulate, decapsulate, and forward data packets between the clients 103A-B and NEs 108-118 within domain 150 of the MEC network 100. In an embodiment, NEs 106 and 107 may be positioned within an access network closest to the clients 103A-B. For example, when the client 103A is connected to the Internet using a fixed line network, for example, via a Digital Subscriber Line (DSL) connection, the NE 106 may be a home gateway. As another example, when the client 103B is connected to the Internet using a wireless communications network, for example, via a Long Term Evolution (LTE) connection, the NE 106 may be a base station.

In some embodiments, NEs 106 and 107 may refer to one of the initial network devices connecting the clients 103A-B to the domain 150. As examples, the NEs 106 and 107 may be aggregation routers, access router, packet gateways, border network gateways, packet switches, broadband remote access servers (BRAS), service router/provider edge (SR/PE) routers, digital subscriber line access multiplexers (DSLAM), optical line terminal (OTL), provider edge (PE) network nodes, customers edge (CE) network nodes, Internet Protocol (IP) routers, etc. In an embodiment, NEs 106 and 107 may refer to a first intermediate network device between the client 103A-B and one of the edge cloud servers 125-129 within the domain 150.

Within domain 150, the NEs 108-118 may be routers, switches, gateways, bridges, or virtual private network (VPNs) configured to encapsulate, forward, and decapsulate packets according to the transport protocols implemented by the MEC network 100. As shown by FIG. 1, NE 114 is connected to an edge cloud server 125, NE 116 is connected to an edge cloud server 126, NE 118 is connected to an edge cloud server 127, NE 110 is connected to an edge cloud server 128, and NE 112 is connected to an edge cloud server 129. Although each edge cloud server 125-129 is only shown in FIG. 1 as being connected to a single NE 113, 116, 110, 112, respectively, it should be appreciated that edge cloud servers 125-129 may be connected to more than one NE 108-118 in the MEC network 100.

Each of the edge cloud servers 125-129 is a miniaturized or compact cloud computing network that is configured to perform computing, processing, storage, and communications on behalf of applications 160 executed at remote sites and clients 103A-B. For example, each of the edge cloud servers 125-129 includes one or more memories, processors, transmitters, receivers, ports, and other hardware that are used to store data, perform tasks or processes, and communicate data on behalf of applications 160 executed at remote sites and clients 103A-B.

As shown by FIG. 1, the edge cloud servers 125-129 are geographically distributed throughout the domain 150. The implementation of edge cloud servers 125-129 throughout the MEC network 100 significantly improves service and application experience for users by increasing throughput and reducing latency.

In some cases, a client 103A-B may be executing complex applications 160 that involve a series of complex tasks 163 that should to be performed to properly execute the application. Each task 163 is a process or computation that may be performed on data (also referred to herein as "offloading data") to properly execute the application 160. However, when a client 103A-B executes these complex applications 160, and thus the series of complex tasks 163, the battery life and processing capabilities of the client 103A-B are compromised because the execution of these applications 160 requires a significant amount of battery and processing power.

In such a case, the client 103A-B may offload one or more of these tasks 163 to one of the edge cloud servers 125-129 in the MEC network 100. By offloading one or more of the tasks 163 to an edge cloud server 125-129, the client 103A-B retains the battery life and processing power that would have otherwise been compromised if the client 103A-B executed these tasks 163 locally.

For example, assume that client 103B is configured to execute an application 160, which involves the execution of one or more tasks 163. Typically, the client 103B would send an offloading request message to a controller (not shown) of the MEC network 100, which retains knowledge of the underlying topology of the domain 150 and a status of each of the edge cloud servers 125-129 in the domain 150. In this case, the controller would determine whether to offload the task 163 based on an amount of energy consumed by the client 103B if the client executes the task 163, an amount of energy consumed by an edge cloud server 125-129 if the edge cloud server 125-129 executes the task 163, and a latency experienced by the client 103B as a result of offloading the task 163 to the edge cloud server 125-129. Subsequently, the controller would determine, for example, that the edge cloud server 126 is able to perform the task 163 on behalf of the client 106B. The controller would then send a message to the client 103B indicating that the edge cloud server 126 is able to perform the task 163 on behalf of the client 106B.

However, in these implementations in which a controller in the MEC network 100 has to make the decision on behalf of the NEs 106-118 and the clients 103A-B, a high signaling overhead is imposed within the MEC network 100. For example, each of the NEs 106-118 has to frequently update the controller with information regarding the topology of the MEC network 100, a status of the respective NE 106-118, and a status of a connected edge cloud server 125-129. In addition, a client 103A-B has to send request messages to the controller and receive response messages from the controller before even determining whether offloading may be performed for a task 163.

In addition, typical methods of determining whether and how to offload a task 163 to an edge cloud server 125-129 only consider the amount of energy consumed by the client 103B to execute the task 163, amount of energy consumed by an edge cloud server 125-129 to execute the task 163, and latency experienced by the client 103B as a result of offloading the task 163 to the edge cloud server 125-129. However, processing delays and transmission delays that may occur at the intermediate NEs 106-118 present between the client 103A-B and the edge cloud server 125-129 are not considered when determining whether and how to offload a task 163. Similarly, a time that the task 163 remains processing at the edge cloud server 125-129 before a result of executing the task 163 is transmitted back to the client 103A-B is also not considered when determining whether and how to offload a task 163.

Continuing with the example in which the client 103B offloads the task 163 to the edge cloud server 126, the typical methods of determining whether and how to offload a task 163 to the edge cloud server 126 would not have considered processing and transmissions delays along the path 166 between a client 103B and the edge cloud server 126. For example, processing delays at NEs 107, 109, 112, and 116 along the path 166 between client 103B and the edge cloud server 126 would not have been considered in determining whether or not to offload the task 163 to the edge cloud server 126. In addition, a time that the task 163 remains processing at edge cloud server 126 before a result of executing the task 163 is transmitted back to the client 103B would not have been considered.

Disclosed herein are embodiments directed to an improvement to the NEs 106-118, enabling the NEs 106-118 to be capable of determining whether and how to offload a task 163 to an edge cloud server 125-129, instead of using a controller to determine whether and how to offload a task 163 to an edge cloud server 125-129. In addition, the embodiments disclosed herein enable NEs 106-118 to determine whether to offload the task 163 not only based on energy consumption and latency, but also based on processing delays, transmissions delays, and delays occurring before transmitting a result of performing the task 163 back to the client 103A-B.

Figure 2:
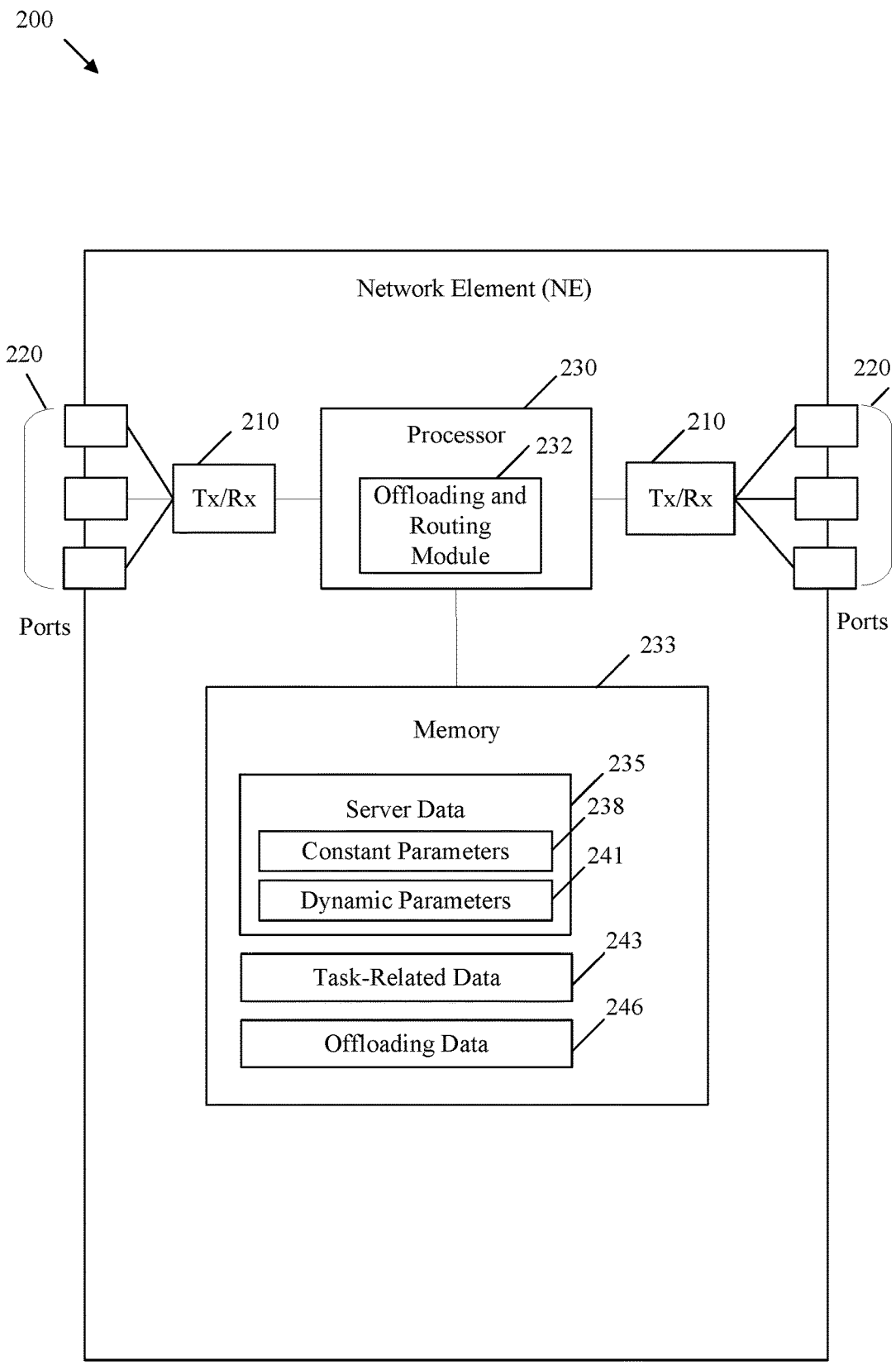
FIG. 2 is a schematic diagram of an NE suitable for implementing the task offloading and routing mechanisms described herein according to various embodiments of the disclosure.

FIG. 2 is a schematic diagram of an NE 200 suitable for implementing the task offloading and routing mechanisms described herein according to various embodiments of the disclosure. In an embodiment, the NE 200 may be implemented as one of the NEs 106-118 in the MEC network 100. In an embodiment, the NE 200 may be implemented as the clients 103A-B. In an embodiment, the NE 200 may also be implemented as one of the edge cloud servers 125-129.

NE 200 comprises ports 220, transceiver units (Tx/Rx) 210, a processor 230, and a memory 233. The processor 230 comprises an offloading and routing module 232. Ports 220 are coupled to Tx/Rx 210, which may be transmitters, receivers, or combinations thereof. The Tx/Rx 210 may transmit and receive data via the ports 220. Processor 230 is configured to process data. Memory 233 is configured to store data and instructions for implementing embodiments described herein. The NE 200 may also comprise electrical-to-optical (EO) components and optical-to-electrical (OE) components coupled to the ports 220 and Tx/Rx 210 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 233. The offloading and routing module 232 is implemented by processor 230 to execute the instructions for implementing various embodiments discussed herein. For example, the offloading and routing module 232 is configured to determine whether to offload a task 163 to one of the edge cloud servers 125-129. In addition, the offloading and routing module 232 is configured to determine one of the edge cloud servers 125-129 that is able to perform the task 163 on behalf of the client 103A-B. The inclusion of the offloading and routing module 232 provides an improvement to the functionality of NE 200. The offloading and routing module 232 also effects a transformation of network element 200 to a different state. Alternatively, the offloading and routing module 232 is implemented as instructions stored in the memory 233.

The memory 233 comprises one or more of disks, tape drives, or solid-state drives and may be used as an over-flow data storage device, to store programs when such programs are selected for execution, and to store instructions and data that are read during program execution. The memory 233 may be volatile and non-volatile and may be read-only memory (ROM), random-access memory (RAM), ternary content-addressable memory (TCAM), and static random-access memory (SRAM).

In an embodiment, the memory 233 is configured to store server data 235, task-related data 243, and offloading data 246. The server data 235 is data that describes one or more attributes or parameters of each of the edge cloud servers 125-129. The server data 235 includes constant parameters 238 and dynamic parameters 241, both of which describe different types of attributes related to an edge cloud server 125-129.

The constant parameters 238 refer to attributes related to an edge cloud server 125-129 that stay constant over time such that updates regarding the constant parameters 238 may not need to be sent to other NEs 106-118 in the MEC network 100. In an embodiment, the constant parameters 238 include a processing speed, a computation latency model, an energy factor, and a network processing delay of the edge cloud server 125-129 being described. The processing speed refers to a processing speed of one or more of the edge cloud servers 125-129. The computation latency model indicates whether the server adopts a deterministic or stochastic model for calculating latency. Based on the model, other parameters maintained for the edge cloud servers 125-129 can be used by the edge cloud servers 125-129 to compute the expected latency for a particular incoming/received computation offloading task 163. The energy factor refers to a significance that the edge cloud server 125-129 assigns to reducing the energy consumed at that edge cloud server 125-129. With the energy factor being small, the energy consumption at the edge cloud server 125-129 is given less significance in the overall energy dissipation on both the edge cloud server 125-129 and the client 103A-B. This can affect the selection of the edge cloud server 125-129 for a particular computation offloading task 163. The network processing delay refers to a total processing delay that is introduced by all the intermediate NEs 106-118 between a current NE 106-118 and the edge cloud server 125-129. The network processing delay is proportional to the number of hops between a current NE 106-118 and the edge cloud server 125-129. As should be appreciated, the constant parameters 238 may include any other parameter or attributes describing each of the edge cloud servers 125-129.

The dynamic parameters 241 refer to attributes related to an edge cloud server 125-129 that change over time based on a status of the edge cloud server 125-129 and the MEC network 100. Updates to the dynamic parameters 241 may be sent to other NEs 106-118 in the MEC network 100 periodically. The dynamic parameters 241 include a network transmission delay, average task arrival rate, and total number of tasks and execution time in the queue. The network processing delay refers to a total processing delay introduced by all the intermediate NEs 106-118 between a current NE 106-118 and the edge cloud server 125-129. The network processing delay is proportional to the number of hops between a current NE 106-118 and the edge cloud server 125-129. The average task arrival rate is a parameter given by the edge cloud server 125-129 if the edge cloud server adopts the stochastic model to calculate latency. The average task arrival rate refers to an average time period during which a task 163 is transmitted from the client 103A-B or a previous NE 106-118 to a current NE 106-118. The total number of tasks and execution time in the queue is a parameter given by the edge cloud server 125-129 if the edge cloud server adopts the deterministic model to calculate latency. The expected execution latency of an incoming task 163 is the sum of the execution time of all tasks 163 in the queue plus its own execution time. A task 163 in the queue may be virtual when the task 163 occurs periodically and the execution time may be predicted. As should be appreciated, the dynamic parameters 241 may include any other parameter or attributes describing each of the edge cloud servers 125-129.

In an embodiment, the task-related data 243 refers to data describing a task 163 that may either be performed locally at the client 103A-B or offloaded to one or more edge cloud servers 125-129. In an embodiment, offloading data 246 refers to the data, such as content, objects, files, libraries, or any other type of file, object or data that may be used during performance, computation, or execution of the task 163. In an embodiment, the offloading data 246 is used by the application 160 executing locally at the client 103A-B to perform the task 163 or used by an edge cloud server 125-129 to perform the task 163 on behalf of the client 103A-B.

It is understood that by programming and/or loading executable instructions onto the NE 200, at least one of the processor 230 and/or memory 233 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
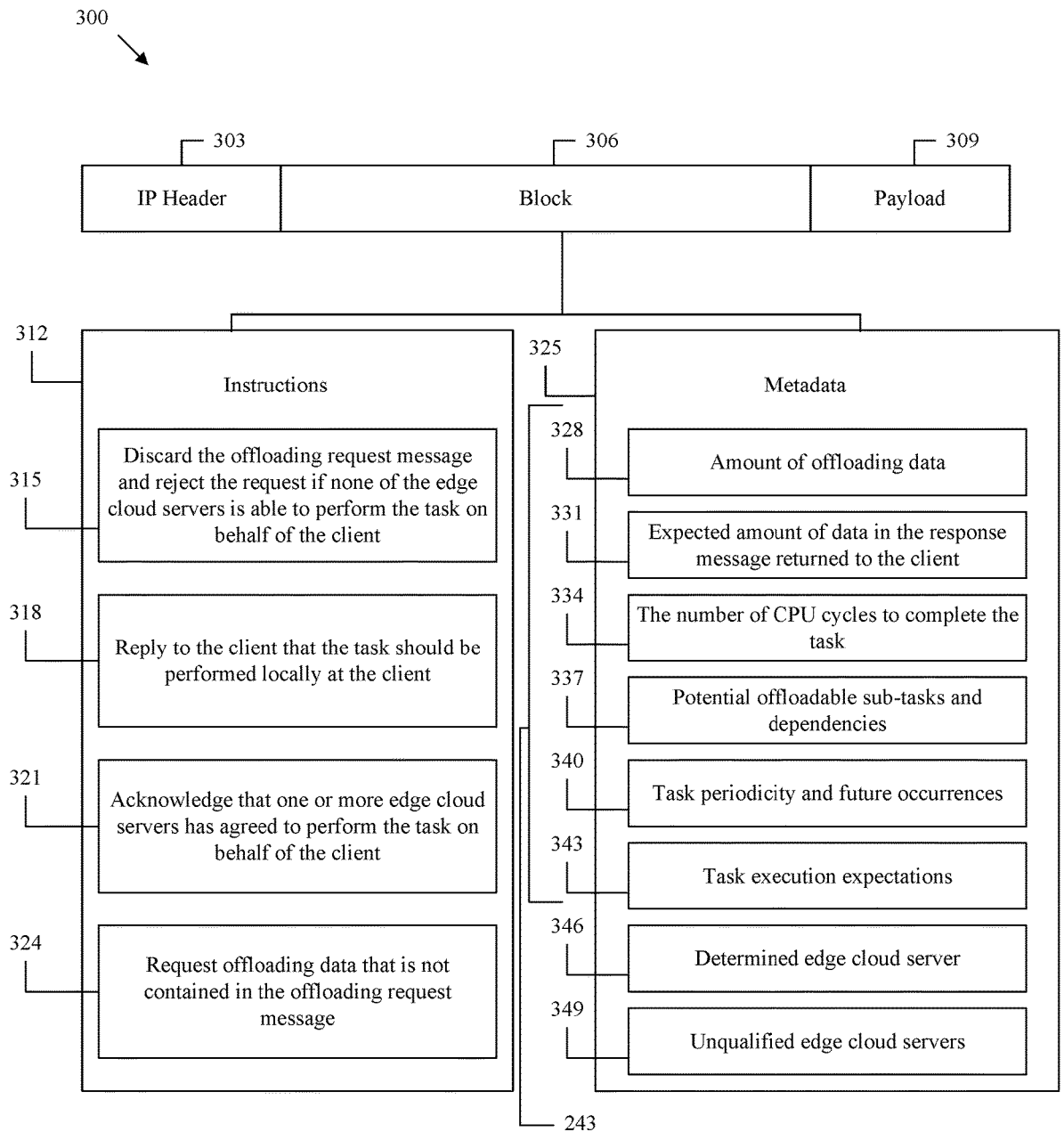
FIG. 3 is a diagram illustrating an offloading request message according to various embodiments of the disclosure.

FIG. 3 is a diagram illustrating an offloading request message 300 according to various embodiments of the disclosure. In an embodiment, the client 103A-B sends offloading request message 300 to NEs 106-107, respectively. In an embodiment, the offloading request message 300 is encoded according to BPP. BPP is further described in U.S. patent application Ser. No. 16/124,770, entitled "self-Driving Packets with Conditional Commands," filed on Sep. 7, 2018, by Renwei Li, et. al. BPP is a network communication protocol used for implementing self-driving packets and packet-programmable statelets. The offloading request message 300 encoding according to BPP includes an Internet Protocol (IP) header 303, a block field 306, and a payload field 309, among other fields not shown in FIG. 3.

The IP header 303 may be an IP version 4 (IPv4) header or an IP version 6 (IPv6) header. The IP header 303 includes or is configured to carry data used by NEs 108-118 in the MEC network 100 to route packets. For example, the IP header 303 may include an IP address of the client 103A-B sending the offloading request message 300.

In an embodiment, the block field 306 includes a set of fields carrying information that is used to determine whether or not to offload a task 163 from a client 103A-B to an edge cloud server 125-129. In an embodiment, the block field 306 carries a set of instructions 312 and metadata 325.

In an embodiment, the set of instructions 312 includes a set of conditional commands used to guide the processing of the offloading request message 300 by one or more of the NEs 106-118 in the MEC network 100. In an embodiment, the set of instructions 312 include instructions 315, 318, 321, and 324. The first instruction 315 includes instructions instructing the NE 106-118 to discard the offloading request message 300 when none of the edge cloud servers 125-129 is able to perform the task 163 on behalf of the client 103A-B. The second instruction 318 includes instructions instructing the NE 106-118 to send a reply to the client 103A-B indicating that the task 163 should be performed locally at the client 103A-B instead of offloaded. The third instruction 321 includes instructions instructing the NE 106-118 to send an acknowledgment to the client 103A-B indicating that one or more edge cloud servers 125-129 has agreed to perform the task 163 on behalf of the client 103A-B. The fourth instruction 324 includes instructions instructing the NE 106-118 to request offloading data 246 that is not otherwise included in the offloading request message 300 from the client 103A-B.

While only instructions 315, 318, 321, and 324 are shown as being included in the set of instructions 312, it should be appreciated that the set of instructions 312 may otherwise include other conditional instructions that should be performed by an NE 106-118 receiving the offloading request message 300. In an embodiment, the set of instructions 312 may be stored at each of the NEs 106-118 in the MEC network 100 such that each of the NEs 106-118 are pre-configured to implement the set of instructions 312 as needed. In this embodiment, the block field 306 need not include the set of instructions 312, which would reduce the overhead resulting from the transmission of the offloading request message 300.

As shown by FIG. 3, the metadata 325 includes the task-related data 243 describing the task 163. In addition, metadata 325 includes data describing the client 103A-B and/or data describing one or more edge cloud servers 125-129. The metadata 325 includes metadata 328, 331, 334, 337, 340, 343, 346, and 349. Metadata 328 includes an amount of offloading data 246 that is to be processed by an edge cloud server 125-129 to perform the task 163 at the edge cloud server 125-129. In an embodiment, when the task 163 includes multiple sub-tasks, the amount of offloading data 246 for each sub-task may be included in the metadata 328.

The metadata 331 includes an expected amount of data included in a response message transmitted back to the client 103A-B after performing the task 163 at an edge cloud server 125-129. The response message includes a result of performing, executing, or computing the task 163 at the edge cloud server 125-129. The metadata 334 includes a number of CPU cycles needed to complete performance of the task 163 at the edge cloud server 125-129.

The metadata 337 includes details regarding sub-tasks stemming from the task 163 and dependences between the sub-tasks, which are used to determine whether the sub-tasks may also be offloaded to one or more other edge cloud servers 125-129. The simplest task model is a data-partition model, where the input data for sub-task is independent from each other and the sub-tasks can be arbitrarily assigned to different edge cloud servers 125-129 and executed in parallel. The most complicated relationship among individual offloadable parts can be expressed by a component dependency graph (CDG) or a call graph (CG). The graph may be a directed acyclic graph (DAG), denoted by G(V, E), where the set of vertices V represents the different sub-tasks and the set of edges E specifies their call dependencies.

The metadata 340 includes details regarding task periodicity indicating whether the task 163 may be performed periodically in the future. In such case, if an edge cloud server 125-129 could accommodate the task 163, the edge cloud server 125-129 may set up virtual tasks in a queue based on the execution period that is included in this field.

Metadata 343 includes task execution expectations, which indicates an expectation of the client 103A-B with regard to deadlines and/or energy expense constraints. Metadata 346 identifies an edge cloud server 125-129 chosen for offloading the task 163, which may be determined by one of the previous NEs 106-118 on a path 166 from the client 103A-B and the edge cloud server 125-129. If this metadata 343 is not detected, the NE 106-118 receiving the offloading request message 300 may determine the edge cloud server 125-129 that should perform the task 163 on behalf of the client 103A-B. If this metadata 343 is detected, then the NE 106-118 receiving the offloading request message 300 forwards the offloading request message 300 along the path to the chosen edge cloud server 125-129.

Metadata 349 identifies the unqualified edge cloud servers 125-129, which may have been added previously by one or more NEs 106-118 upon determining that an edge cloud server 125-129 is unqualified or not able to perform the task 163 on behalf of the client. For example, an edge cloud server 125-129 is unqualified to perform the task 163 when the edge cloud server 125-129 does not have sufficient resources to perform the task 163 based on the metadata 325 associated with the task 163.

In an embodiment, the payload field 309 includes user data sent by the client 103A-B. In an embodiment, the payload field 309 includes the offloading data 246 that may be used to perform the task 163. In another embodiment, the payload field 309 need not include the offloading data 246.

Figure 4A:
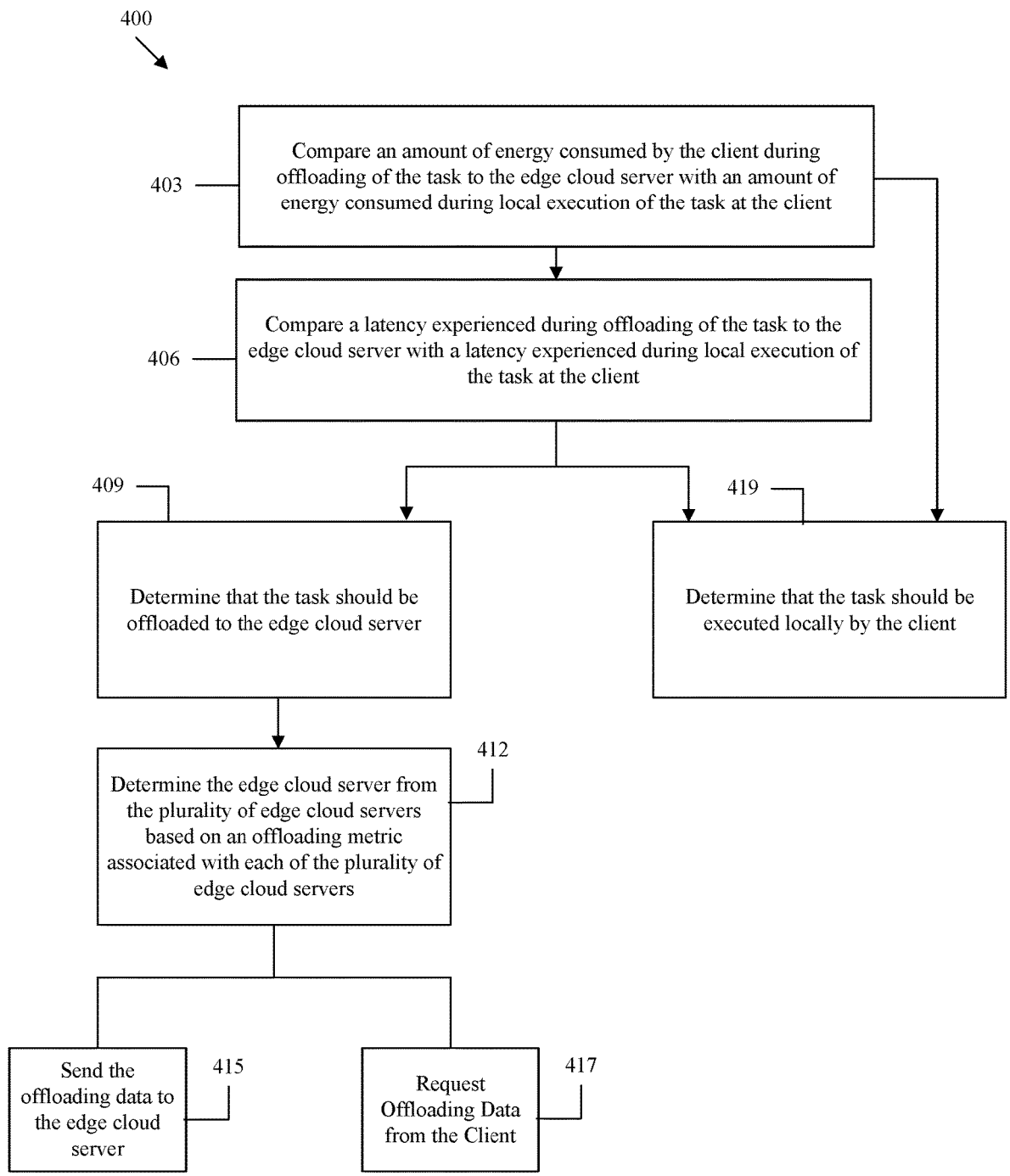
Figure 4B:
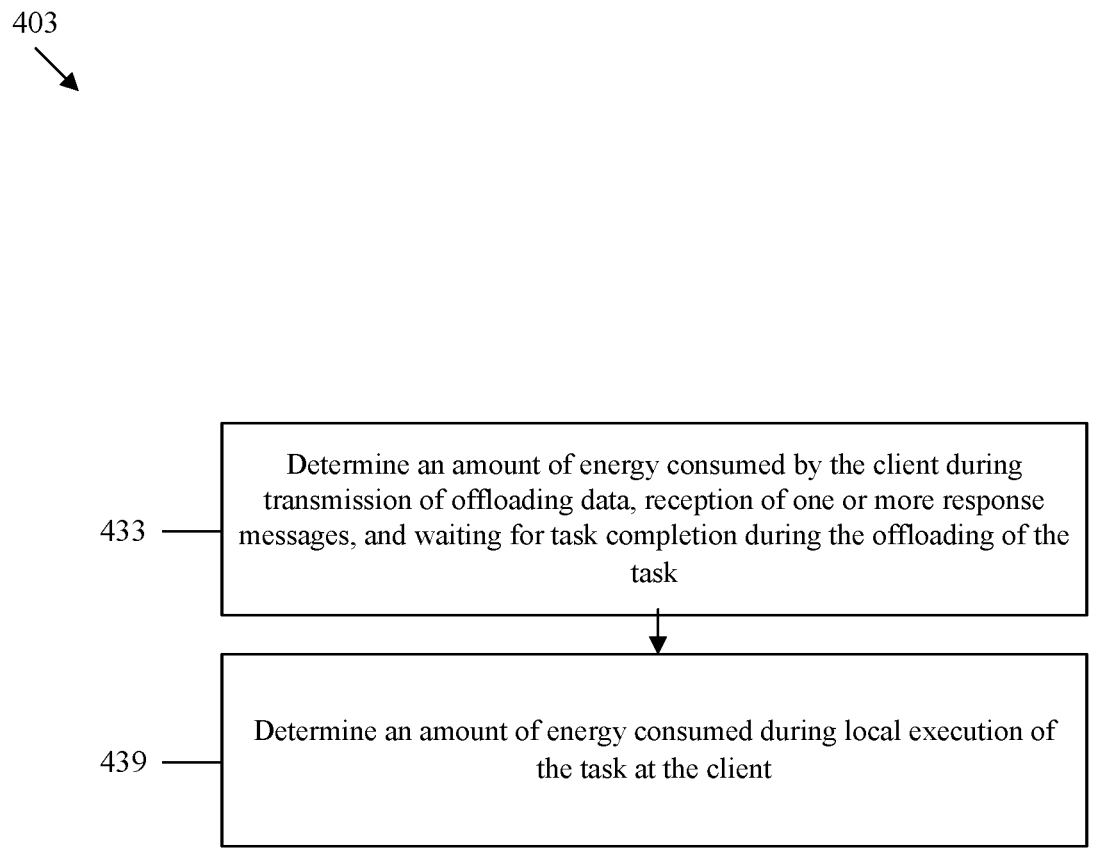

FIGS. 4A-C are flowcharts illustrating methods of offloading and routing a task 163 to an edge cloud server 125-129 within the MEC network 100 according to various embodiments of the disclosure. In particular, FIG. 4A is a method 400 of offloading and routing a task 163 to an edge cloud server 125-129. Method 400 may be implemented by one or more of the NEs 106-118 in the MEC network 100. Method 400 is implemented when an application 160 is executing at a client 103A-B, in which the execution of the application 160 involves the execution of a task 163. Method 400 is implemented after the client 103A-B sends an offloading request message 300 to one or more of the NEs 106-118 in the MEC network 100.

At step 403, after receiving the offloading request message 300, the NE 106-118 compares an amount of energy consumed by the client 103A-B during offloading of the task 163 to the edge cloud server 125-129 with an amount of energy consumed during local execution of the task 163 at the client 103A-B. For example, the offloading and routing module 232 is executed by the processor 230 to compare the amount of energy consumed during offloading of the task 163 to the edge cloud server 125-129 to the amount of energy consumed during local execution of the task 163 at the client 103A-B. Additional details regarding computing the amount of energy consumed during offloading of the task 163 to the edge cloud server 125-129 and computing the amount of energy consumed during local execution of the task 163 at the client 103A-B are further described below with reference to FIG. 4B. In an embodiment, when the amount of energy consumed during offloading of the task 163 to the edge cloud server 125-129 is less than the amount of energy consumed during local execution of the task 163 at the client 103A-B, then method 400 proceeds to step 406.

However, in an embodiment, when the amount of energy consumed by the client 103A-B during offloading of the task 163 to the edge cloud server 125-129 is greater than or equal to than the amount of energy consumed by the client 103A-B during local execution of the task 163 at the client 103A-B, then method 400 proceeds to step 419. At step 419, the NE 106-118 determines that the task 163 should be executed locally by the client 103A-B. The NE 106-118 then transmits the instruction 318 back to the client 103A-B indicating that the task 163 should be performed locally at the client 103A-B and discards the offloading request message 300. In another embodiment, when the amount of energy consumed during offloading of the task 163 to the edge cloud server 125-129 is greater than or equal to than the amount of energy consumed during local execution of the task 163 at the client 103A-B, then method 400 may proceed to step 406.

At step 406, the NE 106-118 compares a latency experienced during offloading of the task 163 to the edge cloud server 125-129 with a latency experienced during local execution of the task 163 at the client 103A-B. For example, the offloading and routing module 232 is executed by the processor 230 to compare the latency experienced during offloading of the task 163 to the edge cloud server 125-129 to the latency experienced during local execution of the task 163 at the client 103A-B. Additional details regarding computing the latency experienced during offloading of the task 163 to the edge cloud server 125-129 and computing the latency experienced during local execution of the task 163 at the client 103A-B is further described below with reference to FIG. 4C. In an embodiment, when the latency experienced during offloading of the task 163 to the edge cloud server 125-129 is less than the latency experienced during local execution of the task 163 at the client 103A-B, then method 400 proceeds to step 409.

However, in an embodiment, when the latency experienced during offloading of the task 163 to the edge cloud server 125-129 is greater than or equal to than the latency experienced during local execution of the task 163 at the client 103A-B, then method 400 proceeds to step 419. At step 419, the NE 106-118 determines that the task 163 should be executed locally by the client 103A-B. The NE 106-118 then transmits the instruction 318 back to the client 103A-B indicating that the task 163 should be performed locally at the client 103A-B and discards the offloading request message 300. In another embodiment, when the latency experienced during offloading of the task 163 to the edge cloud server 125-129 is greater than or equal to than the latency experienced during local execution of the task 163 at the client 103A-B, then method 400 may proceed to step 409.

While FIG. 4A shows that the energy consumption comparison (step 403) is performed before the latency experienced comparison (step 406), it should be appreciated that the latency experienced comparison (step 406) may instead be performed before the energy consumption comparison (step 403). In either case, after performing both the energy consumption comparison (step 403) and the latency experienced comparison (step 406), in any order, the method 400 proceeds to either step 409 or step 419.

In an embodiment, other comparisons may be made before determining whether to offload the task 163 to an edge cloud server 125-129 or to execute the task 163 at the client 103A-B. For example, the set of metadata 325 may include the metadata 343 specifying a deadline time interval by which the client 103A-B expects to receive a response message from the edge cloud server 125-129. In this case, the NE 106-118 compares an expected time by which client 103A-B receives the response message from the edge cloud server 125-129 with the deadline time interval. When the expected time by which client 103A-B receives the response message from the edge cloud server 125-129 is less than the deadline time interval, then method 400 proceeds to step 409. Otherwise, the method 400 proceeds to step 419, in which it is determined that the task 163 should be executed locally by the client 103A-B.

Each of the edge cloud servers 125-129 in the MEC network 100 are heterogeneous machines, meaning that each of the edge cloud servers 125-129 have different processing speeds and power consumption parameters. Therefore, each of the edge cloud servers 125-129 may only be able to accommodate certain types of tasks 163. The server data 235 includes data describing the features of the edge cloud servers 125-129, which may be compared to the metadata 325 to determine an edge cloud server 125-129 able to perform the task 163 on behalf of the client 103A-B.

After determining that the task 163 should be offloaded to one or more edge cloud servers 125-129 at step 409, the method proceeds to step 412. At step 412, the NE 106-118 determines an edge cloud server 125-129 from the multiple edge cloud servers 125-129 within the MEC network 100 based on an offloading metric associated with each of edge cloud servers 125-129. In an embodiment, the offloading metric is based on the metadata 325 included in the offloading request message 300 and the server data 235 stored at the NE 106-118.

In an embodiment, the offloading metric refers to a value or metric that is determined for each one of the edge cloud servers 125-129 based on a computed energy consumption and latency experienced by the respective edge cloud server 125-129 during offloading of the task 163 to the respective edge cloud server 125-129. The energy consumption includes the energy consumed by the client 103A-B and NEs 106-118 on the path 166 during transmission of the offloading request message 300 and offloading data 246 through the MEC network 100 to the respective edge cloud server 125-129.

In an embodiment, during computation of the offloading metrics for each of the edge cloud servers 125-129 in the MEC network 100, the NE 106-118 may not need to compute the offloading metric for the edge cloud servers 125-129 identified as being unqualified in metadata 349. In this case, the NE 106-118 refrains from computing the offloading metric for the edge cloud servers 125-129 identified as being unqualified in metadata 349, but otherwise computes the offloading metric for the remainder of edge cloud servers 125-129 in the MEC network 100.

In an embodiment, the NE 106-118 selects the edge cloud server 125-129 having the lowest offloading metric as the edge cloud server 125-129 to which the task 163 may be offloaded. In an embodiment in which the offloading data 246 has already been received by the NE 106-118 either in the offloading request message 300 or from another packet received from the client 103A-B, method 400 proceeds to step 415. At step 415, the NE 106-118 forwards the offloading data 246 and instructions to execute the task 163 to the selected edge cloud server 125-129 having the lowest offloading metric. For example, the Tx/Rx 210 forwards the offloading data 246 and instructions to execute the task 163 to the selected edge cloud server 125-129 having the lowest offloading metric.

In an embodiment in which the offloading data 246 has not already been received by the NE 106-118, method 400 proceeds to step 417. At step 417, the NE 106-118 sends a request to the client 103A-B for the offloading data 246 such that the offloading data 246 may be forwarded to the selected edge cloud server 125-129 having the lowest offloading metric. For example, the Tx/Rx 210 sends a request to the client 103A-B for the offloading data 246.

FIG. 4B is a flowchart illustrating some of the steps performed during step 403 of method 400, which compares the energy consumed by the client 103A-B during the offloading of the task 163 to the energy consumed during local execution of the task 163. In an embodiment, a first amount of energy consumed by the edge cloud server 125-129 during execution of the task 163 is determined or computed. In an embodiment, the first amount of energy consumed by the edge cloud server 125-129 during execution of the task 163 may be determined using the following Equation (1):

$$E_s^t(k) = \rho_t f(s_k) w_t \quad (1)$$

where t represents the task 163, k represents the edge cloud server 125-129, $\rho_t$ is a parameter that is assigned to the task t, $f(s_k)$ represents the unit energy consumption of cloud edge server k, which is a function of $s_k$, and $w_t$ denotes the amount of computation workload of the task t, which is the computation intensity in CPU cycles per bit times the task input-data size in bits. The first amount of energy consumed by the edge cloud server 125-129 during execution of the task 163 may be computed by the client 103A-B, the edge cloud server 125-129, an operator of the network 100, or any other entity that has access to the network 100.

In an embodiment, the first amount of energy consumed by the edge cloud server 125-129 during execution of the task 163 may be measured by the edge cloud server 125-129 during a previous execution of the task 163 or a task similar to the task 163. In this embodiment, the first amount of energy consumed by the edge cloud server 125-129 during execution of the task 163 may be recorded and stored locally at a memory 233 of the edge cloud server 125.

At step 433, an amount of energy consumed by the client 103A-B while transmitting offloading data 246, waiting for task 163 completion, and receiving one or more response messages is determined or computed. For example, the amount of energy consumed by the client 103A-B while transmitting offloading data 246 may be determined using the following Equation (2):

$$EU_d^t = \frac{AU_d^t * PU_d^t}{BU_d^t * \log_2\left(1 + \frac{x * PU_d^t}{N_0 * BU_d^t}\right)} \quad (2)$$

where $PU_d^t$ is the power used at the client 103A=C to transmit the uplink input data for computation offloading, with a size in bits that is denoted by $AU_d^t$. $BU_d^t$ is the bandwidth allocated for the uplink data transmission. $x*PU_d^t$ is the average received signal power over the bandwidth for data uploading. $N_0*BU_d^t$ is the average power of the noise and interference over the uplink bandwidth.

The amount of energy consumed by the client 103A-B during step 433 may be computed or measured by the client 103A-B, an operator of the network 100, or any other entity that has access to the network 100. In an embodiment, the amount of energy consumed by the client 103A-B during step 433 may be measured by client 103A-B during a previous execution of the task 163 or a task similar to the task 163 or during a previous offloading of the task 163 or a task similar to the task 163. In this embodiment, the second amount of energy may be recorded and stored locally at a memory 233 of the client 103A-B.

The amount of energy consumed by the client 103A-B during reception of one or more response messages, one of which may include a result of performing the task 163, from the edge cloud server 125-129 may be determined using the following Equation (3):

$$EU_d^t = \frac{AD_d^t * PD_d^t}{BD_d^t * \log_2\left(1 + \frac{x * PD_d^t}{N_0 * BD_d^t}\right)} \quad (3)$$

where $PD_d^t$ is the power used at the client 103A-B to receive the result of performing the task 163 on a downlink path, with a size in bits that is denoted by $AD_d^t$. $BD_d^t$ is the bandwidth allocated for the downlink data transmission, and $x*PD_d^t$ is the average received signal power over the bandwidth for data reception. $N_0*BU_d^t$ is the average power of the noise and interference over the downlink bandwidth.

The amount of energy consumed by the client 103A-B while waiting for the edge cloud server 125-129 to perform the task 163 on behalf of the client 103A-B may be determined using the following Equation (4):

$$EW_d^t = TW_d^t * PW_d^t \quad (4)$$

where $TW_d^t$ is the time elapsed before the client 103A-B receives the result of performing the task 163 from the edge cloud server 125-129. The calculation of $TW_d^t$ will be further below. $PW_d^t$ is power consumed by the client 103A-B while waiting for the computation offloading to be completed and the result is returned from the edge cloud server 125-129.

In this way, amount of energy consumed by the client 103A-B during offloading may be determined using the following Equation (5):

$$E_d^t = EU_d^t + ED_d^t + EW_d^t \quad (5)$$

At step 439, an amount of energy consumed during local execution of the task 163 at the client 103A-B is determined. In an embodiment, the energy consumed during local execution of the task 163 at the client 103A-B is mainly consumed by the processor 230 during execution of the task 163. In an embodiment, the amount of energy consumed during local execution of the task 163 at the client 103A-B may be computed or measured by the client 103A-B, the edge cloud server 125-129, an operator of the network 100, or any other entity that has access to the network 100. In an embodiment, the amount of energy consumed during local execution of the task 163 at the client 103A-B is measured by the client 103A-B during a previous execution of the task 163 or a task similar to the task 163. In this embodiment, the amount of energy consumed during local execution of the task 163 at the client 103A-B is recorded and stored locally at a memory 233 of the client 103A-B.

The amount of consumed during local execution of the task 163 at the client 103A-B may be determined using the following Equation (6);

$$ELocal_d^t = \kappa * F_d^2 * w_t \qquad (6)$$

where d represents the client 103A-B, the energy consumption of a CPU cycle is given by $\kappa * F_d^2$, $\kappa$ is a constant related to the hardware architecture and $F_d$ is the CPU-cycle frequency or CPU dock speed of the client 103A-B d, and $w_t$ denotes the amount of computation workload of the task t.

At this stage, the NE 106-118 has determined the amount of energy consumed by the client 103A-B during offloading of the task 163 to the edge cloud server 125-129 and the amount of energy consumed during local execution of the task 163 at the client 103A-B. In this case, after performing step 439, step 406 of method 400 may be performed to compare the latency experienced by the client 103A-B during offloading of the task 163 to the edge cloud server 125-129 to the amount of energy consumed during local execution of the task 163 at the client 103A-B.

FIG. 4C is a flowchart illustrating some of the steps performed during step 406 of method 400, which compares the latency experienced during the offloading of the task 163 to the latency experienced during local execution of the task 163. At step 440, a processing delay of one or more messages occurring at NEs 106-118 along a path 166 between the client 103A-B and the edge cloud server 125-129 before a result of the task is transmitted back to the client 103A-B is determined. For example, the offloading routing module 232 may be executed by the processor 230 to determine the processing delay. The processing delay may be denoted as $LP_d^t(k)$.

At step 443, a transmission delay of one or more messages forwarded by the NEs 106-118 is determined. The transmission delay may be denoted as $LT_d^t(k)$. In an embodiment, the transmission delay is measured as traffic is forwarded by the NE 106-118. In another embodiment, the transmission delay is determined based on a transmission delay experienced at the NE 106-118 during a previous offloading of a task 163 or a task similar to task 163.

At step 446, an execution time that the task 163 remains at the edge cloud server 125-129 during execution or computation before the result of the task is transmitted back to the client 103A-B is determined. The execution time may be denoted as $LE_d^t(k)$. In an embodiment, the execution time is measured when a task 163 or a similar task 163 was previously offloaded to an edge cloud server 125-129. In this embodiment, the execution time is recorded at stored at the memory 232.

At step 449, a latency experienced during offloading of the task 163 to the edge cloud server 125-129 is determined. For example, the offloading routing module 232 may be executed by the processor 230 to determine the latency experienced during offloading of the task 163 to the edge cloud server 125-129. In an embodiment, the latency experienced during offloading of the task 163 to the edge cloud server 125-129 is a sum of the processor delay, transmission delay, and execution time, which determined using following Equation (7):

$$L_d^t(k) = LP_d^t(k) + LT_d^t(k) + LE_d^t(k) \qquad (7)$$

At step 451, a latency experienced during local execution of the task 163 at the client 103A-B is determined. In an embodiment, the latency experienced during local execution of the task 163 at the client 103A-B is determined using the following Equation (8);

$$LLocal_d^t = \frac{w_t}{F_d} \qquad (8)$$

where d represents the client 103A-B, $F_d$ is the CPU-cycle frequency or CPU clock speed of the client 103A-B d, and $w_t$ denotes the amount of computation workload of the task t.

In some embodiments, the following conditions (9), (10), and (11) have to be satisfied by an edge cloud server 125-129 before the edge cloud server 125-129 can be considered as a candidate edge cloud server 125-129 that is able to execute the task 163:

$$E_d^t < ELocal_d^t \qquad (10)$$

$$L_d^t(k) < LLocal_d^t \qquad (11)$$

$$L_d^t(k) < deadline_d^t \qquad (12)$$

$E_d^t < ELocal_d^t$ indicates that the amount of energy consumed during offloading of the task 163 to the edge cloud server 125-129 is less than the amount of energy consumed during local execution of the task 163 at the client 103A-B. $L_d^t(k) < LLocal_d^t$ indicates that the latency experienced during offloading of the task 163 to the edge cloud server 125-129 is less than the latency experienced during local execution of the task 163 at the client 103A-B. $L_d^t(k) < deadline_d^t$ indicates that the expected time by which client 103A-B receives the response message from the edge cloud server 125-129 is less than a deadline time interval set, for example, in the metadata 343.

In an embodiment, the NE 108-118 may proceed to determine an offloading metric associated with each of the edge cloud servers 125-129 that meet the three conditions (9), (10), and (11). The offloading metric is determined using the following equation (12);

$$M_d^t(k) = (E_d^t + a_k * E_s^t(k)) + b_t * L_d^t(k) \qquad (9)$$

where $E_d^t$ represents the amount of energy consumed during offloading of the task 163 to the edge cloud server 125-129, $E_s^t$ first amount of energy consumed by the edge cloud server 125-129 (k) during execution of the task 163, $a_k$ is the weight of the edge cloud server's 125-129 energy consumption, $b_t$ is a constant which expresses the relative weight designated by the client to the overall energy consumption and latency requirements, and $L_d^t(k)$ represents the transmission delay computed at step 443 for the edge cloud server 125-129 (k).

Figure 5:
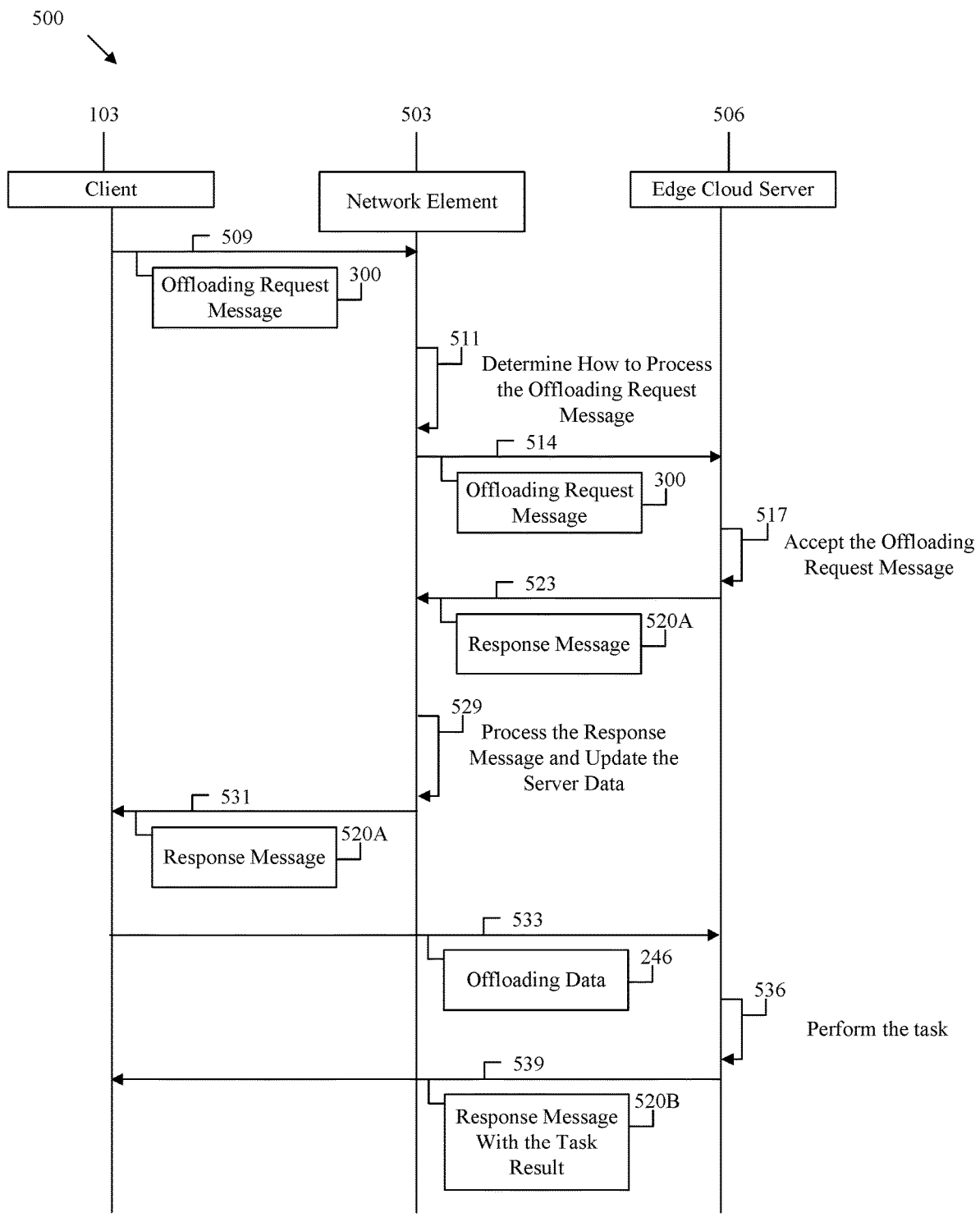
FIG. 5 is a message sequence diagram illustrating communications between a client, an NE, and an edge cloud server in the MEC according to various embodiments of the disclosure.

FIG. 5 is a message sequence diagram 500 illustrating communications between a client 103A-B (hereinafter referred to and shown in FIG. 5 as a "client 103"), one of the NEs 106-118 (hereinafter referred to and shown in FIG. 5 as an "NE 503"), and one of the edge cloud servers 125-129 (hereinafter referred to and shown in FIG. 5 as an "edge cloud server 506") according to various embodiments of the disclosure. In an embodiment, client 103, NE 503, and edge cloud server 506 may include components similar to that shown with respect to NE 200 of FIG. 2. In an embodiment, the NE 503 shown in FIG. 5 may be one of the initial NEs 106 and 107 closest to the client 103, or the NE 503 shown in FIG. 5 may be one of the NEs 108-118 within domain 150 of the MEC network 100. In an embodiment, the message sequence 500 may be implemented when the client 103 is executing an application 160, which involves the execution, performance, or computation of a task 163.

At step 509, the client 103 transmits the offloading request message 300 to the NE 503. For example, the Tx/Rx 210 of client 103 transmits the offloading request message 300 to the NE 503. As should be appreciated, the client 103 may transmit the offloading request message 300 directly to the NE 503, or the client 103 may transmit the offloading request message 300 through one or more intermediate nodes to the NE 503.

At step 511, the NE 503 determines how to process the offloading request message 300. For example, offloading and routing module 232 is executed by the processor 230 to determine how to process the offloading request message 300. In an embodiment, NE 503 may perform method 400 at step 511, which includes the steps shown in FIGS. 4A-C. After performing method 400 at step 511, NE 503 may determine that the edge cloud server 506 is able to perform the task 163 on behalf of the client 103. In an embodiment, the edge cloud server 506 has the lowest offloading metric in the MEC network 100.

At step 514, the NE 503 forwards the offloading request message 300 to the edge cloud server 506 having the lowest offloading metric. For example, the Tx/Rx 210 of the NE 503 transmits the offloading request message 300 to the edge cloud server 506 having the lowest offloading metric.

At step 517, the edge cloud server 506 may determine whether or not to accept the offloading request message 300. For example, offloading and routing module 232 is executed by the processor 230 to determine whether or not to accept the offloading request message 300.

If the edge cloud server 506 determines to accept the offloading request message 300, the edge cloud server 506 may generate a response message 520A. The response message 520A may include an acknowledgement that the edge cloud server 506 will perform the task 163 on behalf of the client 103.

In an embodiment in which the edge cloud server 506 does not already have the offloading data 246 for the task 163, the response message 520A may also include a request for offloading data 246. As described above, the offloading data 246 refers to additional data that may be used to properly perform the task 163 on behalf of the client 103.

In an embodiment, a status of the resources within the edge cloud server 506 may have recently changed, and as such, other NEs in the network may not yet have knowledge of the change in the status of resources at the edge cloud server 506. In this embodiment, the edge cloud server 506 generates updated server data 235 including updated dynamic parameters 241 associated with the change in the status of resources at the edge cloud server 506. In this case, the response message 520A includes the updated server data 235.

At step 523, the edge cloud server 506 transmits the response message 520A back to the NE 503. For example, Tx/Rx 210 of the NE 503 transmits the response message 520A back to the NE 503.

At step 529, the NE 503 processes the response message 520A, and, if the response message 520A includes the updated server data 235, the NE 503 updates the locally stored server data 235 to include the updated server data 235. For example, a memory 233 of the NE 503 already stores server data 235 related to the edge cloud server 506. After receiving the response message 520A, the NE 503 updates the server data 235 to include the updated server data 235. In an embodiment, the dynamic parameters 241 within the updated server data 235 are updated based on the updated server data 235 in the response message 520A.

At step 531, the NE 503 transmits the response message 520A back to the client 103. For example, Tx/Rx 210 of the NE 503 transmits the response message 520A back to the client 103.

In an embodiment, the client 103 determines that the response message 520A includes a request for the offloading data 246 related to the task 163. In this case, at step 533, the client 103 transmits the offloading data 246 directly to the edge cloud server 506. For example, Tx/Rx 210 of the NE 503 transmits the offloading data 246 directly to the edge cloud server 506.

At step 536, the edge cloud server 506 performs the task 163 on behalf of the client 103. For example, the offloading and routing module 232 may be executed by the processor 230 to perform the task 163 on behalf of the client 103. As described above, the task 163 may be a process or computation that should be performed for an application 160 executing on the client 103 to be properly executed.

After the edge cloud server 506 performs the task 163, a result of performing the task 163 may be determined or generated. The result of the task may include any type of data, such as a computed value, a data object, content, etc. For example, when the task 163 is a computational task 163, the performance of the computation task 163 at the edge cloud server 506 generates a result as a computational value. The edge cloud server 506 may generate another response message 520B including the result generated in response to performing the task 163. In an embodiment in which the performance of the task 163 does not generate a result, the edge cloud server 506 may populate the response message 520B with an acknowledgement as to whether the task 163 has been successfully executed.

At step 539, the edge cloud server 506 transmits the response message 520B directly back to the client 103. For example, the Tx/Rx 210 of the edge cloud server 506 transmits the response message 520B directly back to the client 103.

After the client receives the response message 520B, the client 103 may input the result back into the application 160 to continue executing the remainder of the tasks 163 of the application 160. In the case in which a result indicates that the task 163 was successfully performed at the edge cloud server 506, the application 160 may continue executing the remainder of the tasks 163 of the application 160.

Figure 6:
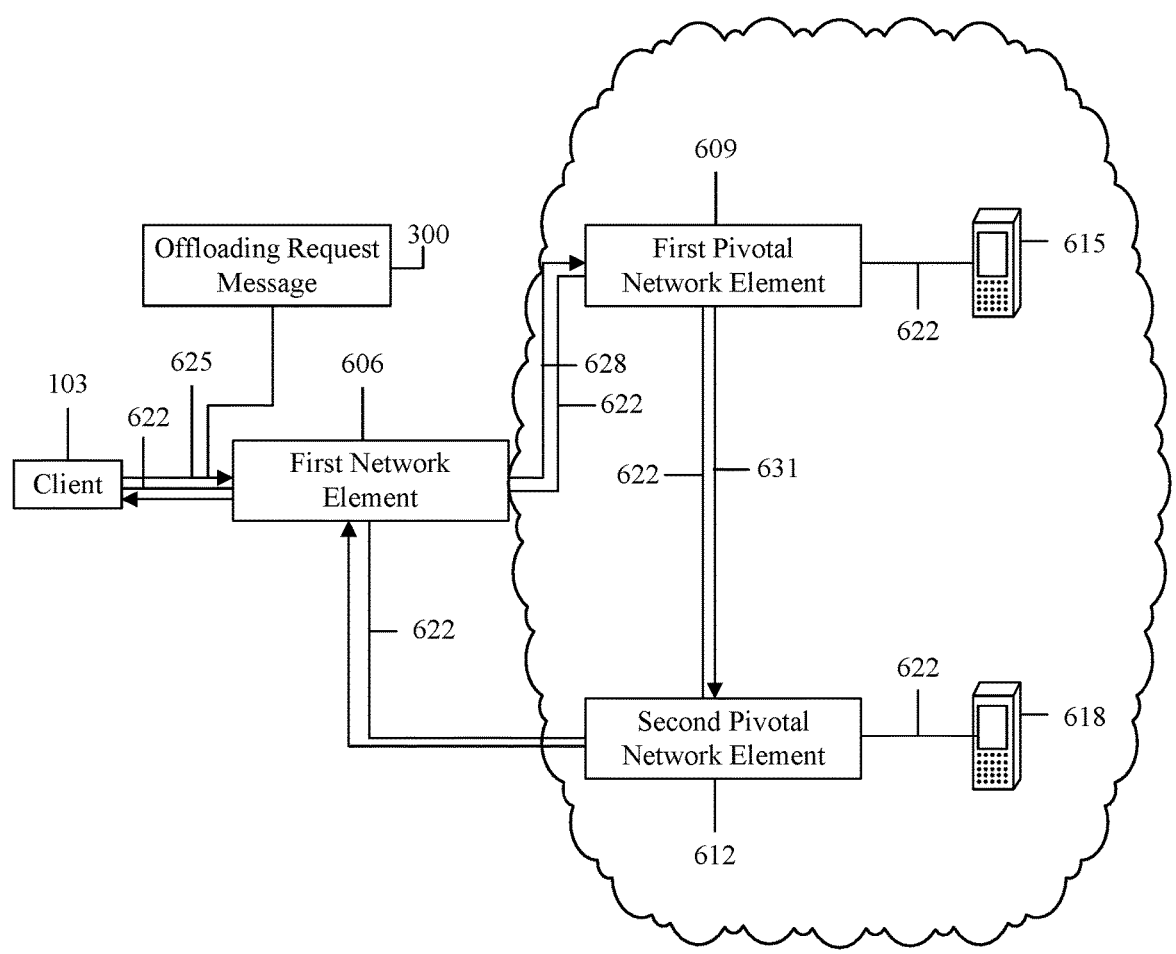
FIG. 6 is a diagram illustrating another MEC network configured to implement task offloading and routing according to various embodiments of the disclosure.

FIG. 6 is a diagram of another MEC network 600 configured to implement task offloading and routing according to various embodiments of the disclosure. The MEC network 600 is similar to the MEC network 100, except that the MEC network 600 includes pivotal NEs 609 and 612 designated for one or more edge cloud servers 615 and 618, respectively.

The MEC network 600 includes the client 103, a first NE 606, a first pivotal NE 609, a first cloud edge server 615, a second pivotal NE 612, and a second cloud edge server 618. While only the client 103, first NE 606, first pivotal NE 609, first cloud edge server 615, second pivotal NE 612, and second cloud edge server 618 are shown in FIG. 6, it should be appreciated that the MEC network 600 may include additional intermediate NEs that are not explicitly shown in FIG. 6.

In an embodiment, the first NE 606 may be similar to NEs 106 and 107 described above with reference to FIG. 1. For example, the first NE 606 may be one of the first or one of initial NEs that is connected to the client 103. For example, the first NE 606 may be a home gateway or a base station positioned within an access network connected to the client 103. In an embodiment, the first pivotal NE 609 and the second pivotal NE 612 are each similar to the NEs 108-118 described above with reference to FIG. 1. In an embodiment, the edge cloud servers 615 and 618 are similar to the edge cloud servers 125-129 described above with reference to FIG. 1.

The client 103 is connected to the first NE 606 via link 622, which may be similar to the client-to-network link 121. The first NE 606 is connected to the first pivotal NE 609 via link 622, which is similar to the inter-network link 120 of FIG. 1. As should be appreciated, there may be several intermediate NEs 108-118 positioned between the first NE 606 and the first pivotal NE 609. The first NE 606 is also connected to the second pivotal NE 612 via link 622, which is also similar to the inter-network link 120 of FIG. 1. As should be appreciated, there may be several intermediate NEs 108-118 positioned between the first NE 606 and the second pivotal NE 612. The first pivotal NE 609 and the second pivotal NE 612 are interconnected via a link 622, which is similar to the inter-network link 120 described above with reference to FIG. 1.

In an embodiment, the first pivotal NE 609 and the second pivotal NE 612 are similar to NEs 108-118 of FIG. 1 in that the first pivotal NE 609 and the second pivotal NE 612 are each configured to encapsulate, forward, and decapsulate packets according to the transmission protocols implemented by the MEC network 600. In an embodiment, the first pivotal NE 609 and the second pivotal NE 612 are additionally configured to maintain the most up-to-date server data 235 (also referred to as updated server data 235) regarding an associated edge cloud server 615 and 618. As shown by FIG. 6, the first pivotal NE 609 is associated with, or attached to, the first edge cloud server 615 via the link 622, which may be similar to the NE-to-server link 122 described above with reference to FIG. 1. In this case, a memory 233 of the first pivotal NE 609 stores the most up-to-date server data 235, including constant parameters 238 and dynamic parameters 241, related to the first edge cloud server 615. Similarly, the second pivotal NE 612 is associated with, or attached to, the second edge cloud server 618 via the link 622, which may be similar to the NE-to-server link 122 described above with reference to FIG. 1. In this case, a memory 233 of the second pivotal NE 612 stores the most up-to-date server data 235, including constant parameters 238 and dynamic parameters 241, related to the second edge cloud server 618.

In an embodiment, an operator or administrator of the MEC network 600 designates one or more NEs connected to an edge cloud server 615 or 618 as being a pivotal NE 609 or 612 for the edge cloud server 615 or 618. In another embodiment, a controller or central entity of the MEC network 600 designates one or more NEs connected to an edge cloud server 615 or 618 as being a pivotal NE 609 or 612 for the edge cloud server 615 or 618.

In an embodiment, all network traffic destined for an edge cloud server 615 or 618 is forwarded through a corresponding pivotal NE 609 or 612 before reaching the edge cloud server 615 or 618. In this embodiment, the edge cloud server 615 or 618 does not need to send updated server data 235 in a response message that is sent to other NEs on a path between the client 103 and the edge cloud server 615 or 618. Instead, the edge cloud server 615 and 618 only sends updated server data 235 to the respective pivotal NEs 609 and 612 upon a status update or periodically based on a predetermined schedule. In addition, in this embodiment, the steps of method 400 may be divided and performed between both the first NE 606 and one of the pivotal NEs 609 or 612.

For example, assume that the client 103 sends an offloading request message 300 to the first NE 606, as shown by arrow 625. The first NE 606 may perform steps 403, 406, 409, and/or 412 of method 400 to determine whether or not to offload the task 163 to one of the edge cloud servers 615 or 618 based on metadata 325 included in the offloading request message 300 and server data 235 already stored locally in a memory 233 of the first NE 606.

As shown by arrow 628, the first NE 606 transmits the offloading request message 300 to a first pivotal NE 609. In an embodiment, the first pivotal NE 609, which has complete knowledge of the server data 235 describing the status of resources at the edge cloud server 615, determines whether the edge cloud server 615 is able to perform the task 163 described in the offloading request message 300 on behalf of the client 103. If so, then the first pivotal NE 609 transmits the offloading request message 300 to the edge cloud server 615, and then the edge cloud server 615 performs the task 163 and transmits a response message 520A back to the client 103 indicating a result of performing the task 163.

If the edge cloud server 615 is not able to perform the task 163, then the first pivotal NE 609 transmits the offloading request message 300 to the second pivotal NE 612, as shown by arrow 631. The second pivotal NE 612 has complete knowledge of the server data 235 describing the status of resources at the edge cloud server 618. The second pivotal NE 612 determines whether the edge cloud server 618 is able to perform the task 163 described in the offloading request message 300 on behalf of the client 103. If so, then the second pivotal NE 612 transmits the offloading request message 300 to the edge cloud server 618, and then the edge cloud server 618 performs the task 163 and transmits a response message 520B back to the client 103 indicating a result of performing the task 163.

If the second pivotal NE 612 is not able to perform the task 163, the second pivotal NE 612 may continue to forward the offloading request message 300 to one or more other pivotal NEs in the MEC network 600 until one of the pivotal NEs identifies an edge cloud server that is able to perform the task 163. If none of the pivotal NEs in the MEC network 600 is associated with an edge cloud server that is able to perform the task 163, a last pivotal NE in the MEC network 600 transmits a response message 520A back to the client 103 indicating that the client 103 should perform the task 163 locally.

Figure 7:
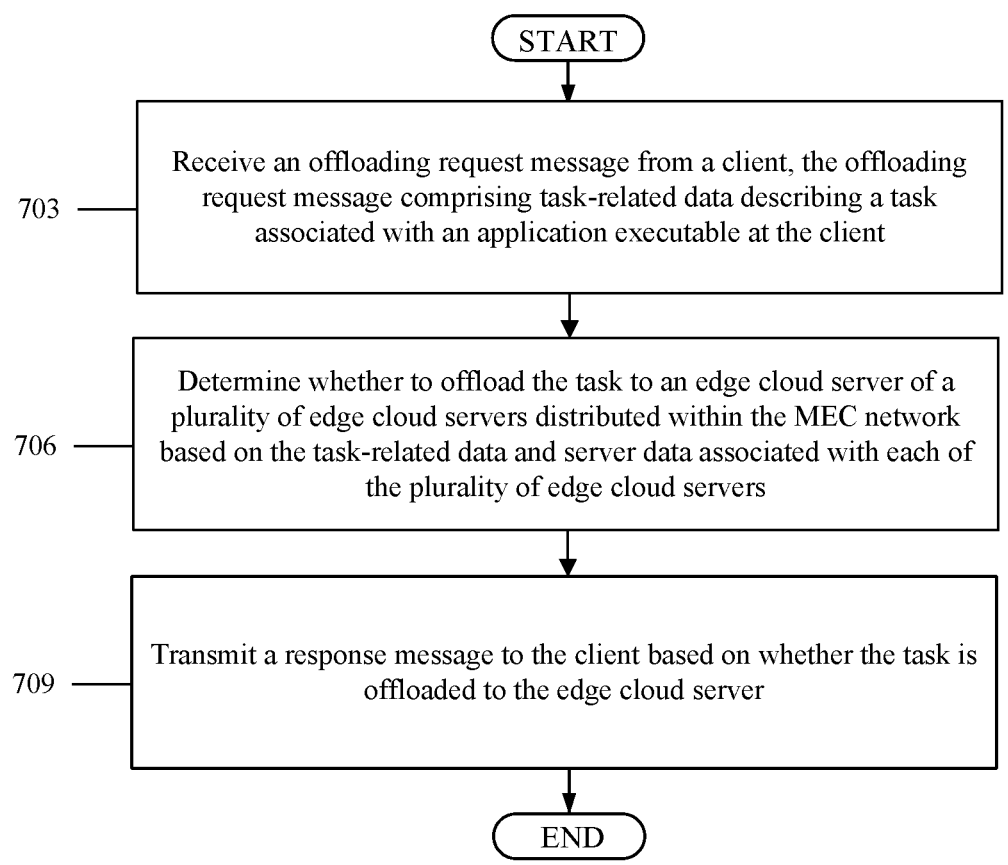
FIG. 7 is a flowchart illustrating a method of offloading and routing a task to an edge cloud server according to various embodiments of the disclosure.

FIG. 7 is a flowchart illustrating a method 700 of offloading and routing a task 163 to an edge cloud server 125-129, 615, or 618 according to various embodiments of the disclosure. Method 700 may be implemented by one or more of the NEs 106-118 in the MEC network 100. Method 700 may also be implemented by the first NE 606 or pivotal NEs 609 and 612 of the MEC network 600. Method 700 is implemented when an application 160 is executing at a client 103, in which execution of the application 160 involves executing a task 163. Method 700 is implemented after the client 103 sends an offloading request message 300 to one or more of the NEs 106-118 in the MEC network 100.

At step 703, an offloading request message 300 is received from a client 103. For example, Tx/Rx 210 receives the offloading request message 300 from the client 103.

In an embodiment, the offloading request message 300 carries task-related data 243 describing a task 163 associated with an application 160 executable at the client 103. In an embodiment, the offloading request message 300 is encoded according to BPP, and the offloading request message 300 carries the task-related data 243 or metadata 325 in a block field 306 between a standard IP header 303 and a payload 309.

At step 706, a determination is made as to whether to offload the task 163 to an edge cloud server 125-129, 615, or 618 of a plurality of edge cloud servers 125-129, 615, or 618 distributed within the MEC network 100 or 600 based on the task-related data 243 and server data 235 associated with each of the edge cloud servers 125-129, 615, or 618. In an embodiment, the task offloading and routing module 232 is executed by the processor 230 to determine whether to offload the task 163 to an edge cloud server 125-129, 615, or 618.

At step 709, a response message 520A or 520B is transmitted to the client 103 based on whether the task 163 is offloaded to an edge cloud server 125-129, 615, or 618. For example, Tx/Rx 210 transmits the response message 520A or 520B to the client 103.

In an embodiment, the response message 520A may include a reply to the client 103 indicating that the client 103 should perform the task locally. In an embodiment, the response message 520A may include a request for offloading data 246. In an embodiment, the response message 520A may include updated server data 235. In an embodiment, the response message 520B may include a result of performing the task 163.

Figure 8:
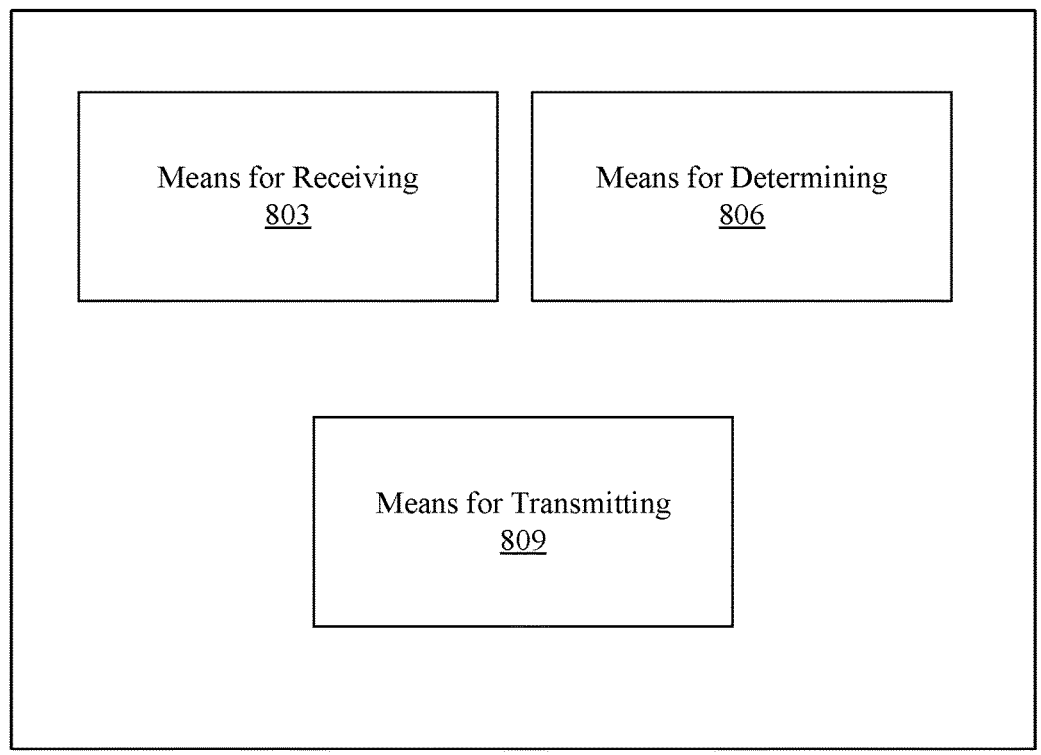
FIG. 8 is an apparatus for offloading and routing a task to an edge cloud server according to various embodiments of the disclosure.

FIG. 8 is an apparatus 800 for offloading and routing a task 163 to an edge cloud server 125-129, 615, or 618 according to various embodiments of the disclosure. Apparatus 800 comprises a means for receiving 803, a means for determining 806, and a means for transmitting 809. The means for receiving 803 comprises a means for receiving an offloading request message 300 from a client 103. In an embodiment, the offloading request message 300 carries task-related data 243 describing a task 163 associated with an application 160 executable at the client 103. In an embodiment, the offloading request message 300 is encoded according to BPP, and the offloading request message 300 carries the task-related data 243 or metadata 325 in a block field 306 between a standard IP header 303 and a payload 309. The means for determining 806 comprises a means for determining whether to offload the task 163 to an edge cloud server 125-129, 615, or 618 of a plurality of edge cloud servers 125-129, 615, or 618 distributed within the MEC network 100 or 600 based on the task-related data 243 and server data 235 associated with each of the edge cloud servers 125-129, 615, or 618. The means for transmitting 809 includes a means for transmitting a response message 520A or 520B based on whether the task 163 is offloaded to an edge cloud server 125-129, 615, or 618.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a mobile edge cloud (MEC) network, comprising:

receiving an offloading request message from a client, the offloading request message comprising task-related data describing a task associated with an application executable at the client;

determining whether to offload the task to an edge cloud server of a plurality of edge cloud servers distributed within the MEC network based on the task-related data and server data associated with each of the plurality of edge cloud servers by comparing a latency experienced during offloading of the task to the edge cloud server with a latency experienced during local execution of the task at the client, wherein the latency experienced during offloading of the task to the edge cloud server includes a processing delay of one or more messages occurring along a path between the client and the edge cloud server before a result of the task is received by the client, a transmission delay of the one or more messages at one or more NEs on the path, and an execution time that the task remains at the edge cloud server for executing before the result is transmitted by the edge cloud server; and transmitting a response message to the client based on whether the task is offloaded to the edge cloud server.

2. The method of claim 1, wherein the offloading request message comprises a block field, wherein the block field is configured to carry metadata associated with the task and instructions to be executed by one or more NEs on a path between the client and the edge cloud server, wherein the metadata comprises at least one of the task-related data, characteristics of the client, or characteristics of the edge cloud server.

3. The method of claim 1, wherein determining whether to offload the task to the edge cloud server comprises:

comparing an amount of energy consumed by the client during offloading of the task to the edge cloud server with an amount of energy consumed during local execution of the task at the client.

4. The method of claim 3, wherein comparing the amount of energy consumed during offloading of the task to the edge cloud server with the amount of energy consumed during local execution of the task at the client comprises:

determining an amount of energy consumed by the client during transmission of offloading data, reception of one or more response messages, and waiting for task completion during the offloading of the task; and determining the amount of energy consumed during local execution of the task at the client.

5. The method of claim 1, wherein comparing the latency experienced during offloading of the task to the edge cloud server with the latency experienced during local execution of the task at the client comprises:

determining a processing delay of a plurality of messages occurring at a plurality of NEs along a path between the client and the edge cloud server before a result of the task after being executed by the edge cloud server is transmitted to the client;

determining a transmission delay of the plurality of messages forwarded by the plurality of NEs;

determining an execution time for the edge cloud server to perform the task and transmit the result of the task back to the client;

determining the latency experienced during offloading of the task to the edge cloud server based on a sum of the processing delay, transmission delay, and execution time; and determining the latency experienced during local execution of the task at the client.

6. The method of claim 1, wherein determining whether to offload the task to the edge cloud server comprises determining that the task should be offloaded to the edge cloud server in response to an amount of energy consumed at the NE during offloading of the task to the edge cloud server being less than an amount of energy consumed during local execution of the task at the client, the latency experienced during offloading of the task to the edge cloud server being less than the latency experienced during local execution of the task at the client, and a response time between the client sending the offloading request message and receiving the response message during offloading of the task to the edge cloud server being less than a deadline response time specified by the client.

7. The method of claim 6, further comprising determining the edge cloud server from the plurality of edge cloud servers based on an offloading metric associated with each of the plurality of edge cloud servers, wherein the offloading metric is based on a latency and an energy consumption experienced as a result of offloading the task to the edge cloud server.

8. The method of claim 1, wherein determining whether to offload the task to the edge cloud server comprises determining that the task should be executed locally at the client in response to an amount of energy consumed at the NE during offloading of the task to the edge cloud server being greater than or equal to an amount of energy consumed during local execution of the task at the client.

9. A network element (NE), comprising:
a memory comprising instructions; and
a processor coupled to the memory and configured to execute the instructions, which cause the processor to be configured to:
receive an offloading request message from a client, the offloading request message comprising task-related data describing a task associated with an application executable at the client;
determine whether to offload the task to an edge cloud server of a plurality of edge cloud servers distributed within a network based on the task-related data and server data associated with each of the plurality of edge cloud servers, wherein to determine whether to offload the task to the edge cloud server, the instructions further cause the processor to be configured to compare a latency experienced during offloading of the task to the edge cloud server with a latency experienced during local execution of the task at the client, wherein the latency experienced during offloading of the task to the edge cloud server includes a processing delay of one or more messages occurring along a path between the client and the edge cloud server before a result of the task is received by the client, a transmission delay of the one or more messages at one or more NEs on the path, and an execution time that the task remains at the edge cloud server for executing before the result is transmitted by the edge cloud server; and
transmit a response message to the client based on whether the task is offloaded to the edge cloud server.

10. The NE of claim 9, wherein the offloading request message comprises a block field, wherein the block field is configured to carry metadata associated with the task and instructions to be executed by one or more NEs on a path between the client and the edge cloud server, wherein the metadata comprises at least one of the task-related data, characteristics of the client, or characteristics of the edge cloud server.

11. The NE of claim 10, wherein:
to compare an amount of energy consumed during offloading of the task to the edge cloud server with the amount of energy consumed during local execution of the task at the client, the instructions further cause the processor to be configured to:
determine an amount of energy consumed by the client during transmission of offloading data, reception of one or more response messages, and waiting for task completion during the offloading of the task;
determine the amount of energy consumed during local execution of the task at the client; and
to compare the latency experienced during offloading of the task to the edge cloud server with the latency experienced during local execution of the task at the client, the instructions further cause the processor to be configured to:
determine a processing delay of a plurality of messages occurring at a plurality of NEs along a path between the client and the edge cloud server before a result of the task after being executed by the edge cloud server is transmitted to the client;
determine a transmission delay of the plurality of messages forwarded by the plurality of NEs;
determine an execution time for the edge cloud server to perform the task and transmit the result of the task back to the client;
determine the latency experienced during offloading of the task to the edge cloud server based on a sum of the processing delay, transmission delay, and execution time; and
determine the latency experienced during local execution of the task at the client.

12. The NE of claim 9, wherein the instructions further cause the processor to be configured to:
compare an amount of energy consumed during offloading of the task to the edge cloud server with an amount of energy consumed during local execution of the task at the client.

13. The NE of claim 9, wherein, to determine whether to offload the task to the edge cloud server, the instructions further cause the processor to be configured to determine that the task should be offloaded to the edge cloud server in response to an amount of energy consumed at the NE during offloading of the task to the edge cloud server being less than an amount of energy consumed during local execution of the task at the client, the latency experienced during offloading of the task to the edge cloud server being less than the latency experienced during local execution of the task at the client, and a response time between the client sending the offloading request message and receiving the response message during offloading of the task to the edge cloud server being less than a deadline response time specified by the client.

14. The NE of claim 9, wherein, to determine whether to offload the task to the edge cloud server, the instructions further cause the processor to be configured determine that the task should be executed locally at the client in response to an amount of energy consumed at the NE during offloading of the task to the edge cloud server being greater than or equal an amount of energy consumed during local execution of the task at the client.

15. The NE of claim 9, wherein the instructions further cause the processor to be configured to maintain server data in a memory of the NE, wherein the server data comprises constant parameters and dynamic parameters associated with each of the plurality of edge cloud servers, wherein the constant parameters describe features of each of the plurality of edge cloud servers that stay constant over time, and wherein the dynamic parameters describe features of the plurality of edge cloud servers that are frequently updated based on network conditions.

16. A non-transitory computer readable medium configured to store a computer program product comprising computer executable instructions that, when executed by a processor of a network element (NE) implemented in a network, cause the NE to:
   receive an offloading request message from a client, the offloading request message comprising task-related data describing a task associated with an application executable at the client;
   determine whether to offload the task to an edge cloud server of a plurality of edge cloud servers distributed within the network based on the task-related data and server data associated with each of the plurality of edge cloud servers, wherein to determine whether to offload the task to the edge cloud server, the computer executable instructions further cause the NE to compare a latency experienced during offloading of the task to the edge cloud server with a latency experienced during local execution of the task at the client, wherein the latency experienced during offloading of the task to the edge cloud server includes a processing delay of one or more messages occurring along a path between the client and the edge cloud server before a result of the task is received by the client, a transmission delay of the one or more messages at one or more NEs on the path, and an execution time that the task remains at the edge cloud server for executing before the result is transmitted by the edge cloud server; and
   transmit a response message to the client based on whether the task is offloaded to the edge cloud server.

17. The non-transitory computer readable medium of claim 16, wherein the offloading request message comprises a block field, wherein the block field is configured to carry metadata associated with the task and instructions to be executed by one or more NEs on a path between the client and the edge cloud server, wherein the metadata comprises at least one of the task-related data, characteristics of the client, or characteristics of the edge cloud server.

18. The non-transitory computer readable medium of claim 16, wherein the instructions further cause the NE to:
   compare an amount of energy consumed during offloading of the task to the edge cloud server with an amount of energy consumed during local execution of the task at the client.

19. The non-transitory computer readable medium of claim 16, wherein the instructions further cause the NE to determine that the task should be offloaded to the edge cloud server in response to an amount of energy consumed at the NE during offloading of the task to the edge cloud server being less than an amount of energy consumed during local execution of the task at the client, the latency experienced during offloading of the task to the edge cloud server being less than the latency experienced during local execution of the task at the client, and a response time between the client sending the offloading request message and receiving the response message during offloading of the task to the edge cloud server being less than a deadline response time specified by the client.

20. The non-transitory computer readable medium of claim 16, wherein the instructions further cause the NE to determine that the task should be executed locally at the client in response to an amount of energy consumed at the NE during offloading of the task to the edge cloud server being greater than or equal to an amount of energy consumed during local execution of the task at the client.

\* \* \* \* \*